(12) United States Patent
Hase et al.

(10) Patent No.: US 7,635,532 B2
(45) Date of Patent: Dec. 22, 2009

(54) POLYMER ELECTROLYTE FUEL CELL

(75) Inventors: Nobuhiro Hase, Mino (JP); Hiroki Kusakabe, Sakai (JP); Hideo Ohara, Katano (JP); Shinsuke Takeguchi, Kadoma (JP); Yoshiaki Yamamoto, Katano (JP); Tatsuto Yamazaki, Moriguchi (JP); Masayo Sugou, legal representative, Tokyo (JP)

(73) Assignee: Panasonic Corporation, Osaka (JP)

( * ) Notice: Subject to any disclaimer, the term of this patent is extended or adjusted under 35 U.S.C. 154(b) by 625 days.

(21) Appl. No.: 11/451,306

(22) Filed: Jun. 13, 2006

(65) Prior Publication Data

US 2006/0269810 A1 Nov. 30, 2006

Related U.S. Application Data

(60) Division of application No. 10/392,903, filed on Mar. 21, 2003, now Pat. No. 7,378,169, which is a continuation of application No. PCT/JP02/03315, filed on Apr. 2, 2002.

(30) Foreign Application Priority Data

| Apr. 3, 2001 | (JP) | ............................... 2001-104107 |
| Apr. 6, 2001 | (JP) | ............................... 2001-109140 |
| May 14, 2001 | (JP) | ............................... 2001-142791 |
| Jun. 13, 2001 | (JP) | ............................... 2001-179194 |

(51) Int. Cl.
*H01M 2/02* (2006.01)

(52) U.S. Cl. ............................. 429/34; 429/30; 429/38; 429/26

(58) Field of Classification Search .................... 429/34, 429/38, 39, 30, 26, 24
See application file for complete search history.

(56) References Cited

U.S. PATENT DOCUMENTS

| 5,023,151 | A  | 6/1991  | Landau et al. |
| 6,180,273 | B1 | 1/2001  | Okamoto |
| 6,186,254 | B1 | 2/2001  | Mufford et al. |
| 6,329,090 | B1 | 12/2001 | McElroy et al. |

FOREIGN PATENT DOCUMENTS

EP 0 955 686 A1 11/1999

(Continued)

OTHER PUBLICATIONS

European Search Report, issued in corresponding European Patent Application No. 02708775.8-2119, mailed on Oct. 30, 2007.

(Continued)

*Primary Examiner*—Raymond Alejandro
(74) *Attorney, Agent, or Firm*—McDermott Will & Emery LLP

(57) ABSTRACT

A decrease in voltage in a polymer electrolyte fuel cell comprising stack of unit cells caused by the temperature difference between the cells located at the ends and the other cells due to a differential in heat dissipation from end plates is prevented by controlling the cooling temperature of the cells closest to the end plates of the fuel cell without affecting the output voltage of the cells in the middle by not including a coolant flow channel in the conductive separator plate between at least one of the end plates and the unit cell located closest to the one of the end plates.

4 Claims, 21 Drawing Sheets

FOREIGN PATENT DOCUMENTS

| | | |
|---|---|---|
| EP | 0 959 511 A2 | 11/1999 |
| JP | 63-16577 | 1/1988 |
| JP | 02-168565 | 6/1990 |
| JP | 4-43568 | 2/1992 |
| JP | 5-159792 A | 6/1993 |
| JP | 7-130388 A | 5/1995 |
| JP | 8-7908 A | 1/1996 |
| JP | 08-130025 | 5/1996 |
| JP | 8-130025 A | 5/1996 |
| JP | 8-130028 A | 5/1996 |
| JP | 08-138692 | 5/1996 |
| JP | 08130028 * | 5/1996 |
| JP | 10-340736 A | 12/1998 |
| JP | 2000-277132 A | 10/2000 |
| JP | 2001-202984 | 7/2001 |
| WO | WO 01/18896 A1 | 3/2001 |

OTHER PUBLICATIONS

Supplementary European Search Report issued in corresponding European Patent Application No. EP 02 70 8775, dated Jan. 17, 2007.

* cited by examiner

F I G. 3
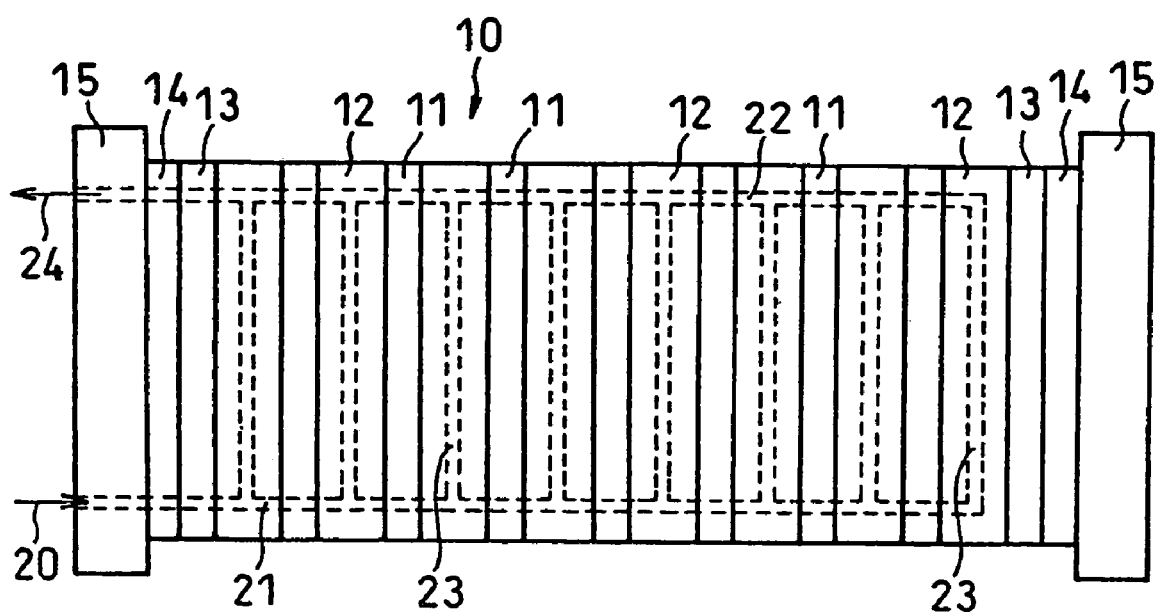

F I G. 1 2
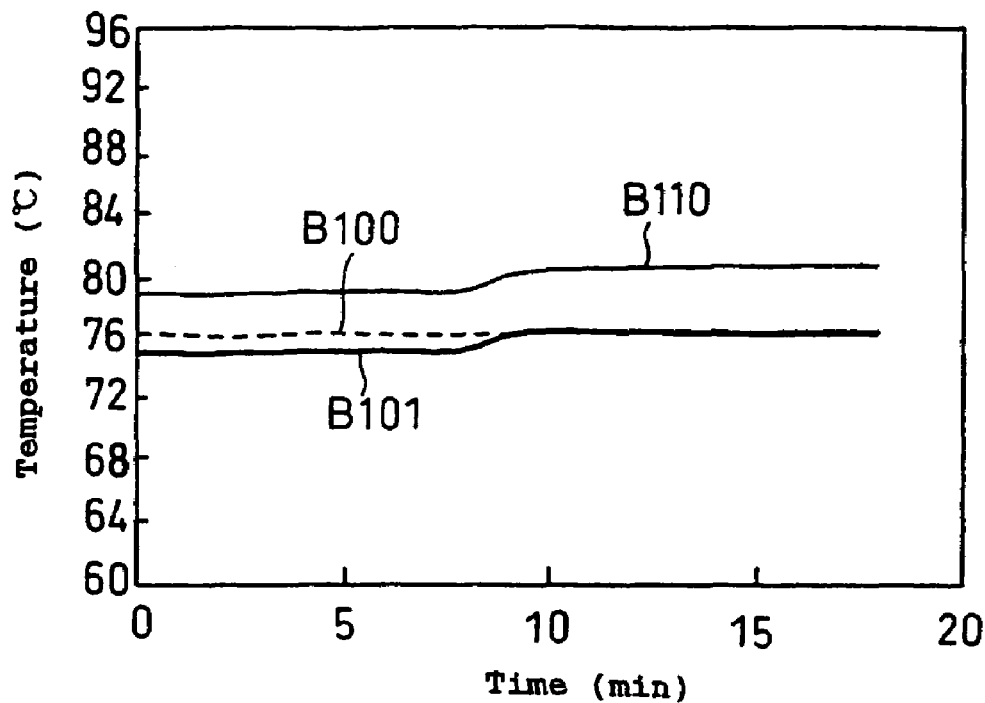
F I G. 1 3
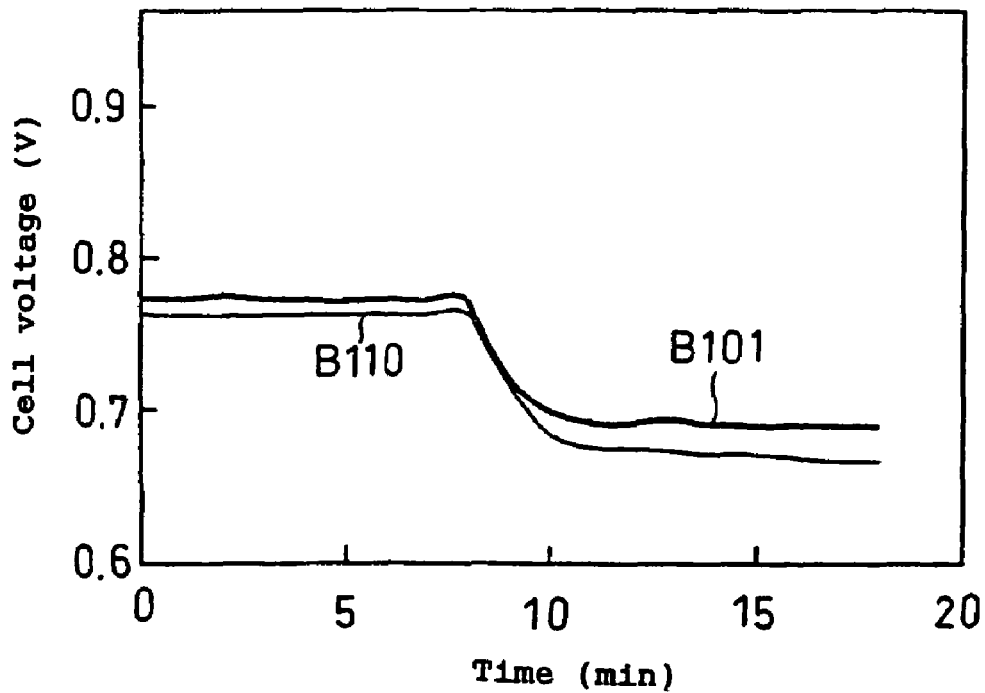

F I G. 14
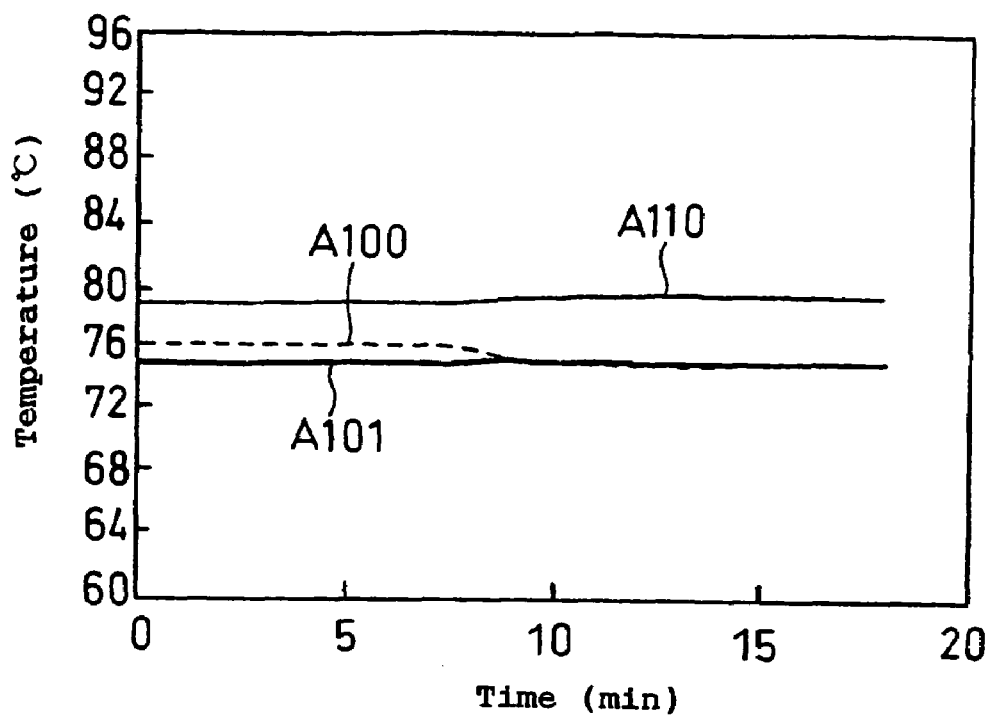
F I G. 15
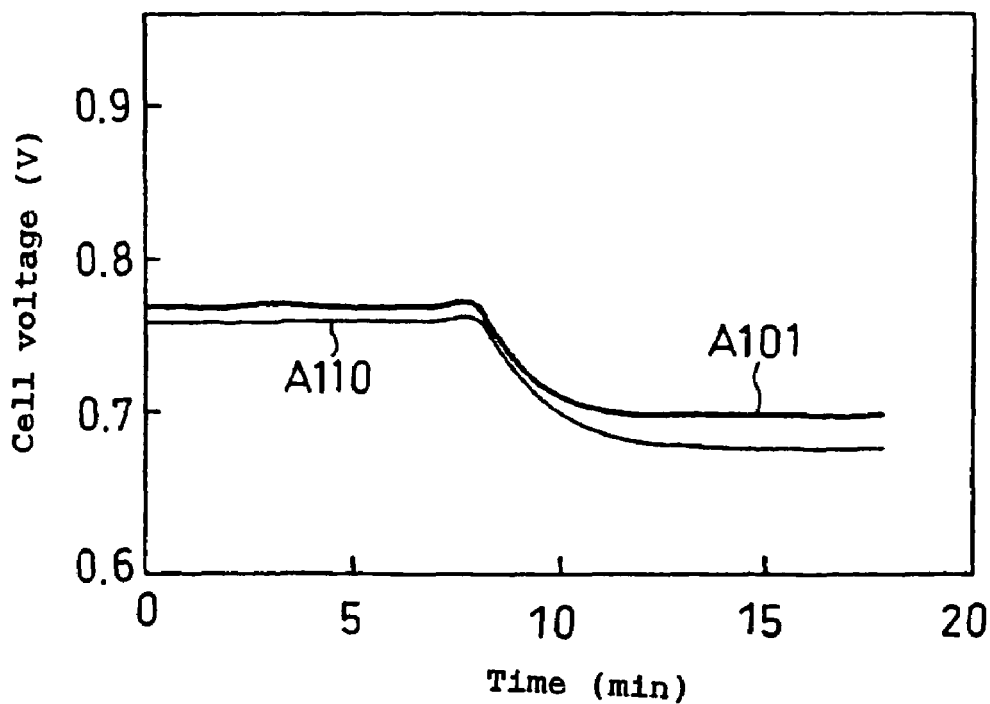

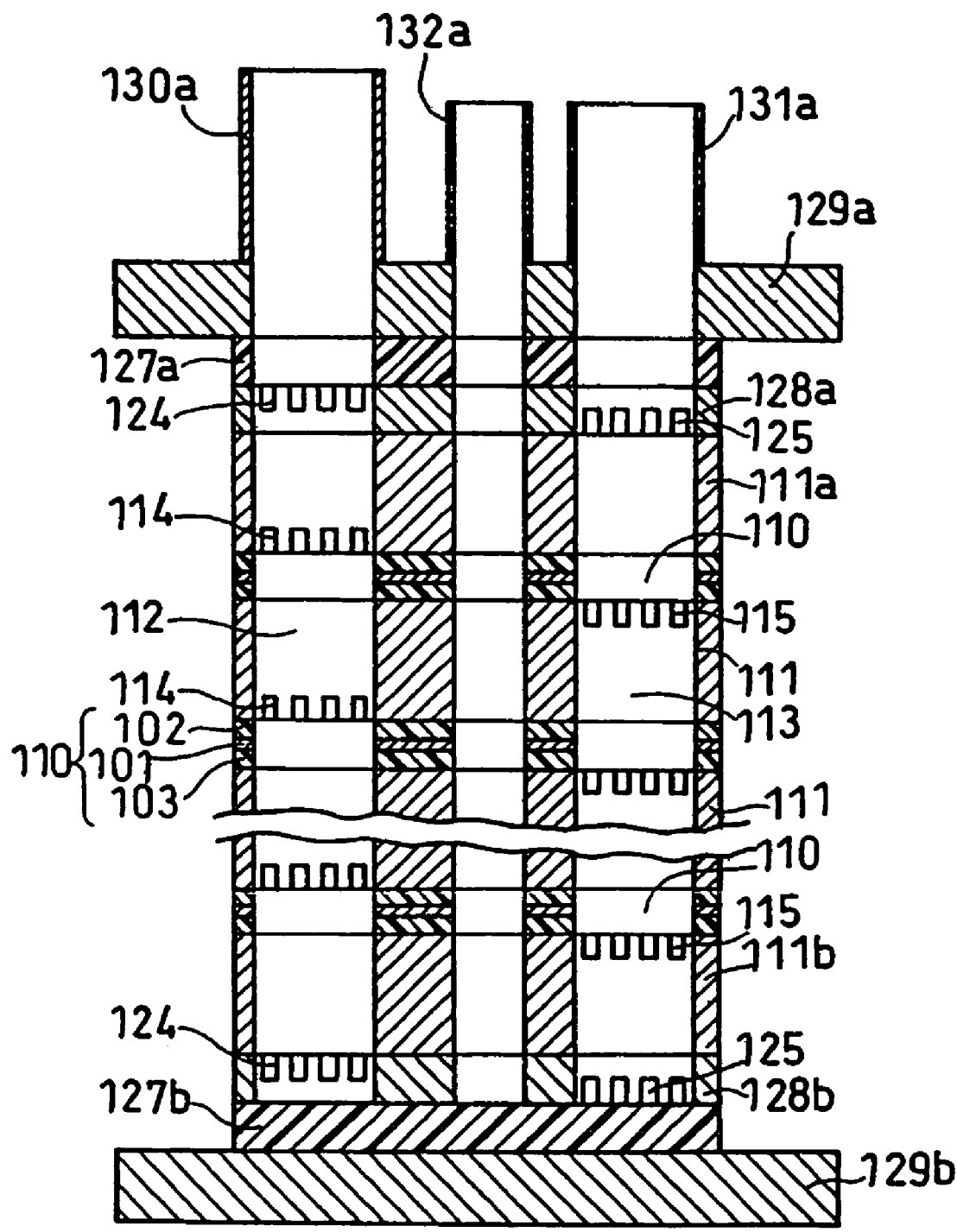
F I G. 3 2

POLYMER ELECTROLYTE FUEL CELL

RELATED APPLICATIONS

This application is a divisional of U.S. patent application Ser. No. 10/392,903 now U.S. Pat. No. 7,378,169, filed Mar. 21, 2003 and issued May 27, 2008, which is a continuation of International Application No. PCT/JP02/03315 filed on Apr. 2, 2002, which is based on Application Serial No. JP2001-104107 filed on Apr. 3, 2001 in Japan, Application Serial No. JP2001-109140 filed on Apr. 6, 2001 in Japan, Application Serial No. JP2001-142791 filed on May 14, 2001 in Japan, and Application Serial No. JP2001-179194 filed on Jun. 13, 2001 in Japan, the contents of which are hereby incorporated by reference.

FIELD OF INVENTION

The present invention relates to a polymer electrolyte fuel cell used for portable power sources, electric vehicle power sources, domestic cogeneration systems or the like and to a method of operation thereof.

BACKGROUND OF THE INVENTION

Fuel cells generate electric power by electrochemically reacting a fuel gas containing hydrogen with an oxidant gas containing oxygen such as air through a polymer electrolyte membrane that selectively transports hydrogen ions. Fuel cells generally have a laminated structure in which a large number of unit cells are stacked. When operated, fuel cells produce heat as well as electric power. Thus, stacked cells need to be provided with a cooling plate every a few unit cells in order to keep cell temperature constant.

There is a need to humidify the fuel gas and the oxidant gas. Hence, polymer electrolyte membranes used in polymer electrolyte fuel cells need to be moistened sufficiently with water. If the cell temperature is too high, saturated vapor pressure increases and the water content in the polymer electrolyte membrane therefore decreases, thereby deteriorating cell performance. If the cell temperature is too low, due to generation of water on the oxidant gas side by cell reactions, condensation of water vapor hinders sufficient permeation of the oxidant gas, thereby impairing cell performance. Thus, the temperature of the fuel cell needs to be maintained within an optimal temperature range.

A stack comprising a large number of stacked unit cells is called a "fuel cell stack." It comprises membrane-electrode assemblies and separator plates having gas flow channels formed in their surfaces. The membrane-electrode assemblies and separator plates are stacked alternately. The stack includes a current collector plate for collecting generated power and an insulating plate disposed on each end which are sandwiched by end plates.

Each unit cell is cooled by a coolant flowing inside the separator plate so that the cell is maintained at suitable temperatures. However, unit cells close to the end plates tend to have lower cell temperatures in comparison with the cells in the middle of the stack because of heat dissipation that takes place due to the temperature difference between the cells and the outside air.

When a fuel cell is not generating power, no heat is generated. The cell temperature therefore in the unit cells located close to the end plates is at or close to outside temperature which is substantially lower than the operating temperature of the cell. In such a state, if humidified fuel and oxidant gases are introduced in order to start power generation, condensation is likely to occur in the gas flow channels, in particular in those cells furthest from the inlet of the oxidant gas to the fuel cell. The occurrence of condensation hinders the respective gases from permeating into the cells, possibly causing a phenomenon of voltage instability during power generation.

Also, when the fuel cell is controlled such that the amount of power generated is lower than the rated output, less heat is evolved by cell reactions. Hence, similar condensation is likely to occur in the gas flow channels in the unit cells located close to the end plates. The temperature is also low in cells located at the central portion of the cell stack. Thus, there is a possibility, although not so large in comparison with the unit cells located close to the end plates, of output instability in the central cells.

Thus, it is necessary to control temperature such that the output of the unit cells close to the end plates does not decrease in any operation state regardless of the amount of power generated.

Such voltage instability of the unit cells located close to the end plates due to condensation could be eliminated by constantly circulating the coolant at high temperature. However, this method causes the temperature of the coolant to rise unnecessarily in the case where the fuel cell generates sufficiently large amounts of power, and therefore, large amounts of heat, so that the water content in the polymer electrolyte membrane decreases. This impairs the power generating capacity of the cell because when the temperature of the coolant is set high in an attempt to avoid the above-mentioned output instability caused by condensation and the amount of power generation is raised thereafter, the temperature of the unit cells in the center of the stack becomes too high due to heat evolution by cell reactions, so that the output of these cells decreases.

SUMMARY OF THE INVENTION

A polymer electrolyte fuel cell in accordance with the present invention comprises: (a) a cell stack in which unit cells each comprise a polymer electrolyte membrane sandwiched between an anode and a cathode; (b) multiple unit cells stacked with each cell separated by a conductive separator plate; (c) a pair of current collector plates and a pair of end plates, both of which sandwich the cell stack; (d) supply and discharge manifolds for a fuel gas and an oxidant gas through which the fuel gas and the oxidant gas are supplied and discharged to and from the anode and the cathode of the cell stack, respectively; (e) a coolant flow channel formed in a part of the conductive separator plates; and (f) a coolant inlet and a coolant outlet for circulating a coolant through the coolant flow channel, wherein the conductive separator plate between at least one of the end plates and the unit cell located closest to the one of the end plates has no coolant flow channel therein.

The conductive separator plate between the end plate which is furthest from an oxidant gas inlet of the fuel cell and the unit cell located closest to the end plate preferably has no coolant flow channel therein. The conductive separator plate having no coolant flow channel therein is preferably a separator plate which comes in contact with the cathode.

An object of the present invention is to provide a polymer electrolyte fuel cell capable of highly efficient power generation by reducing the imbalance of output caused by the temperature difference between the end cells closest to the end plates and the cells located at the center of the cell stack.

In order to achieve the above-mentioned object, the present invention provides a fuel cell and a method of operation capable of eliminating overcooling of the cells located at the ends.

The present invention also provides a means for eliminating condensed water generated by overcooling of the cells located at the ends or clogging of the gas flow channels caused thereby.

The present invention provides a method for using the polymer electrolyte fuel cell in which the temperature of the coolant introduced into the fuel cell is changed depending on the amount of power generation of the fuel cell.

BRIEF DESCRIPTION OF THE DRAWINGS

FIG. 3 is a front view illustrating a conventional polymer electrolyte fuel cell stack.

FIG. 12 is a plot indicating cell temperature characteristics of a fuel cell system in Comparative Example 2.

FIG. 13 is a plot indicating cell voltage characteristics of the fuel cell system in Comparative Example 2.

FIG. 14 is a plot indicating cell temperature characteristics of a fuel cell system in Example 2.

FIG. 15 is a plot indicating cell voltage characteristics of the fuel cell system in Example 2.

FIG. 32 is a longitudinal sectional view of a fuel cell in Embodiment 9 of the present invention.

DETAILED DESCRIPTION OF THE INVENTION

Figure 1:
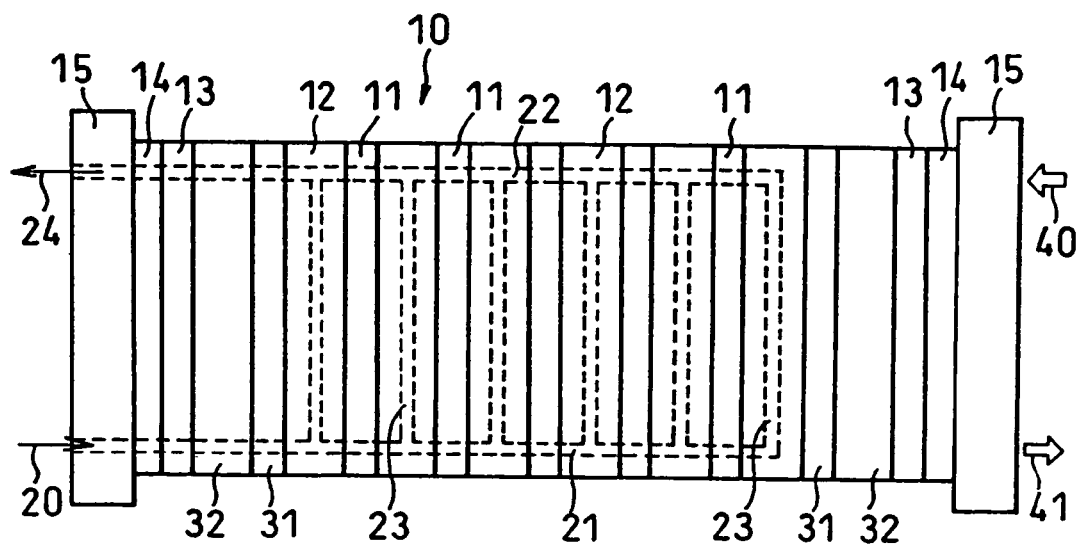
FIG. 1 is a front view illustrating a polymer electrolyte fuel cell stack of Embodiment 1 of the present invention.

According to the present invention, a cell stack comprising unit cells separated by conductive separator plates includes at least one conductive separator plate having no coolant flow channel therein that is inserted between at least one end plate and the unit cell located closest to the one end plate, so that overcooling of the unit cell or cells located at the end of the cell stack is prevented. Accordingly, the present invention provides a polymer electrolyte fuel cell capable of higher efficient power generation by stabilizing the output of the end cell while sufficiently cooling the cells other than the end cell.

In a preferred embodiment of the present invention, the polymer electrolyte fuel cell further comprises a coolant temperature adjusting means for adjusting the temperature on the coolant inlet side, a temperature measuring means for measuring the temperature of the coolant and a temperature controlling means for controlling the coolant temperature adjusting means on the basis of temperature information from the temperature measuring means. In this embodiment, it is further preferable to include a second temperature measuring means for measuring the temperature of the cell stack, wherein the temperature controlling means controls the coolant temperature adjusting means on the basis of temperature information from the temperature controlling means and the second temperature measuring means.

In another preferred embodiment of the present invention, the polymer electrolyte fuel cell further includes a valve installed in an exhaust path of the oxidant gas and a valve controlling means that closes the valve when output voltage of the cell becomes lower than a predetermined value and opens the valve after a predetermined period of time.

In another preferred embodiment of the present invention, the polymer electrolyte fuel cell further includes a valve installed in an exhaust path of the oxidant gas and a valve controlling means that closes the valve when output voltage of the cell becomes lower than a first predetermined value and opens the valve when output voltage of the cell becomes lower than a second predetermined value which is lower than the first predetermined value.

In another preferred embodiment of the present invention, the polymer electrolyte fuel cell has a mist discharge groove communicating with the supply and discharge manifolds for the fuel gas or oxidant gas on the current collector plates in their surfaces contacting the conductive separator plates or on the conductive separator plates contacting the current collector plates in their surfaces contacting the current collector plates.

It is preferred that portions of the mist discharge groove connecting with the supply and discharge manifolds for the fuel gas or oxidant gas be unevenly located to the lower side with respect to the direction of gravity in which the cell stack is installed.

A method of operation of the fuel cell in accordance with the present invention is characterized in that the temperature of the coolant introduced into the fuel cell is changed depending of the amount of power generated by the fuel cell. When increasing the amount of power generated, the temperature of the coolant is decreased continuously or in stages. When decreasing the amount of power generated by the fuel cell, the temperature of the coolant is increased continuously or in stages.

The present invention provides a method of operation of the polymer electrolyte fuel cell in which the temperature of the coolant introduced into the fuel cell is changed depending on the temperatures of the separator plates, the current collector plates, or the end plates of the fuel cell.

The present invention further provides for a method of operation of the polymer electrolyte fuel cell in which an exhaust path for the oxidant gas is closed and opened when output voltage of the cell becomes lower than a predetermined value in order to promote discharge of water content in the exhaust path.

In the following, embodiments of the present invention will be described with reference to drawings.

Embodiment 1

FIG. 1 illustrates a polymer electrolyte fuel cell in this embodiment.

A fuel cell stack 10 comprises (a) membrane-electrode assemblies 11, each of which constitutes a unit cell composed of a polymer electrolyte membrane and an anode and a cathode sandwiching the membrane, and (b) conductive separator plates 12 having a coolant flow channel 23 therein. The membrane-electrode assemblies and the conductive separator plates are stacked alternately to form a cell stack. On each side of the cell stack are a membrane-electrode assembly 31, which is the same as the above-described membrane-electrode assembly, and a conductive separator plate 32 having no coolant flow path therein. A pair of current collector plates 13, a pair of insulating plates 14, and a pair of end plates 15 are disposed outside at the ends of the stack. The resultant stack is clamped by clamping members that are not shown.

A coolant for cooling the cells flows from inlet 20 formed in one of the end plates through an inlet-side manifold 21 that is provided so as to communicate with the insulating plate 14, current collector plate 13, membrane-electrode assemblies 11 and 31, and separator plates 12 and 32, into flow channels 23 formed inside the separator plates 12 to cool neighboring cells. The coolant flows through an outlet-side manifold 22 and is discharged from an outlet 24 to outside of the fuel cell stack 10. The coolant flow channels 23 are formed inside the separator plates 12 and are almost parallel to the surfaces of the separator plates. The coolant flowing in channels 23 keeps the cell temperature constant. Although not shown, the fuel cell stack 10 includes inlet-side and outlet-side manifolds for supplying each of a fuel gas and an oxidant gas to each of the unit cells. The gas flow channels communicating with these manifolds are formed in the anode- and cathode-contacting surfaces of the separator plates. An inlet 40 and an outlet 41 for the oxidant gas are formed, for example, in the end plate 15 on the right side of FIG. 1. Also, an inlet and an outlet for the fuel gas are formed in the end plate on the left side of the figure.

As described, this embodiment is a preferable example in which the separator plate 32 having therein no coolant flow channel is disposed between the end plate on each side and the membrane-electrode assembly 31 closest to the end plate. In this example, all the separator plates 12 have the coolant flow channel therein, but it is also possible that only a part of the separator plates 12 has the coolant flow channel. Usually, the separator plates having the coolant flow channel are arranged regularly, for example, every two cells.

Embodiment 2

Figure 2:
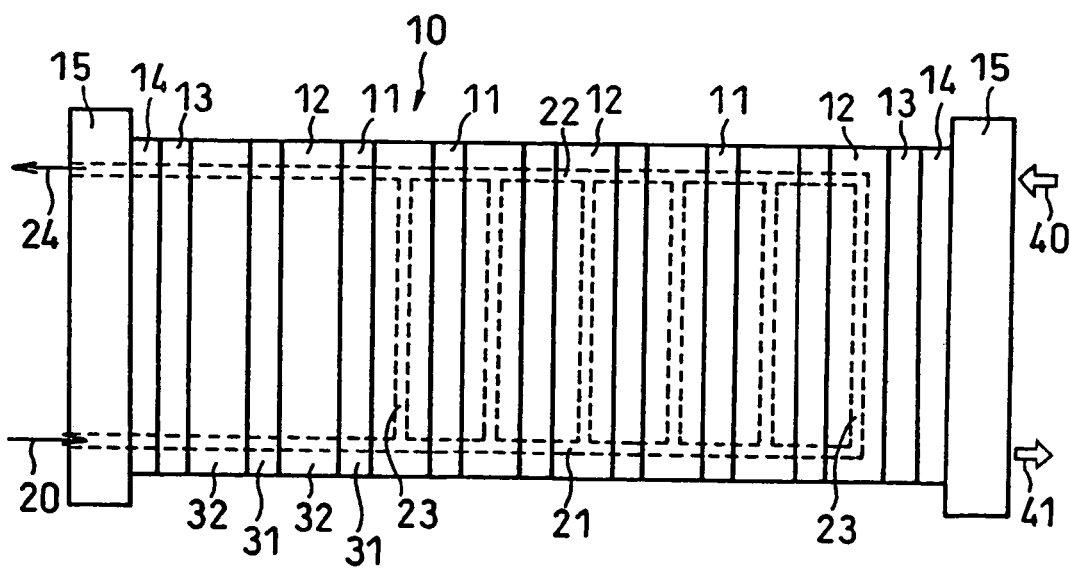
FIG. 2 is a front view illustrating a polymer electrolyte fuel cell stack of Embodiment 2 of the present invention.

FIG. 2 illustrates a polymer electrolyte fuel cell in this embodiment. In this embodiment, two conductive separator plates 32, which have no coolant flow channels, are adjacent to the end plate that is furthest from an oxidant gas inlet 40 and which has no coolant flow channel therein. The cell is sandwiched between the separator plates 32 and is not directly cooled on both the anode and cathode sides by a coolant. The cathode side of the cell sandwiched between the separator plate 32 and a separator plate 12 is not directly cooled by the coolant.

The above-described embodiment illustrated in FIG. 2 is not to be construed as limiting the number of cells stacked in the fuel cell of the present invention, the number of separator plates having the coolant flow channel arranged, the arrangement pattern or the like. Also, the coolant flow channels do not need to be strictly parallel to the surfaces of the separator plates. With respect to the number of separator plates 32 having no coolant circulating flow channel therein, while FIG. 2 illustrates two, the number may be more than two. However, it is desirable to set the number in consideration of the flow rate of the coolant, the temperature of the coolant, the current density during power generation by the stack, the amount of heat dissipation from the end plates and the like such that the temperatures of the inner cells and the cells close to the end plates become as equal as possible.

Also, the above-described embodiment is not to be construed as limiting the introducing direction of the coolant. The insulating plate 14 can be integrated with the end plate by imparting an insulating property to part of the end plate. As the coolant, insulating media such as water, Florinato (3M of the U.S.), a mixture including antifreeze such as ethylene glycol, and the like, may be used.

Comparative Example 1

FIG. 3 illustrates the structure of a conventional polymer electrolyte fuel cell.

Fuel cell stack 10 comprises membrane-electrode assemblies 11, each of which constitutes a unit cell composed of a polymer electrolyte membrane, and an anode and a cathode sandwiching the membrane, and conductive separator plates 12 having a coolant flow channel 23 therein. The membrane-electrode assemblies or cells 11 and separator plates 12 are stacked alternately. On both sides of this stack, a pair of current collector plates 13, a pair of insulating plates 14, and a pair of end plates 15 are disposed.

Figure 6:
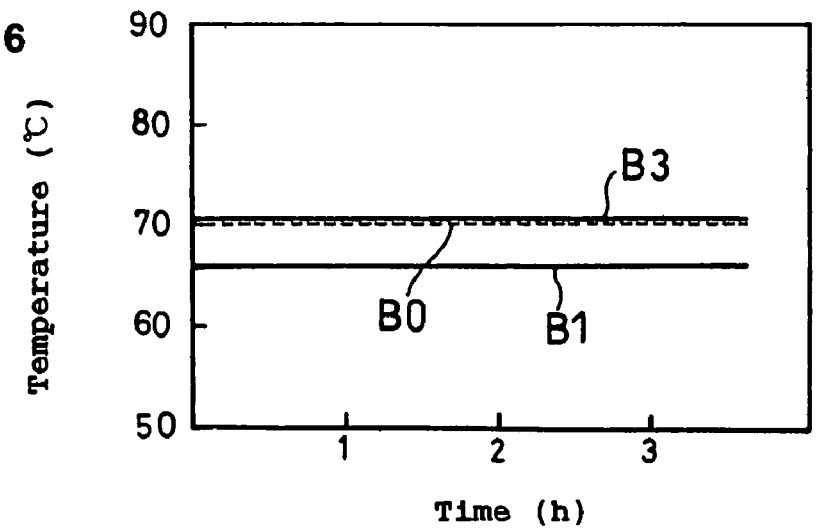
FIG. 6 is a plot indicating temperature characteristics of unit cells of a conventional polymer electrolyte fuel cell stack.

FIG. 6 shows one example of the result of cell temperature measurement during power generation of a polymer electrolyte fuel cell in the conventional polymer electrolytes fuel cell. The cell stack is composed of 81 separator plates and 80 cells. All of the separator plates have a coolant flow channel therein. The temperature of each cell was measured by a thermocouple embedded in the separator plates that supplied an oxidant gas to the cells tested. B1 is a plot of time verses the temperature of the cell closest to one end plate, and B3 is a plot of time verses the temperature of the third cell from the one end plate. B0 is the target value of cell temperature.

FIG. 6 indicates that the temperature of the cell closest to the end plate is lower than the temperature target value because the fuel cell stack is overcooled due to the influence of heat dissipation from the end plate side.

Figure 7:
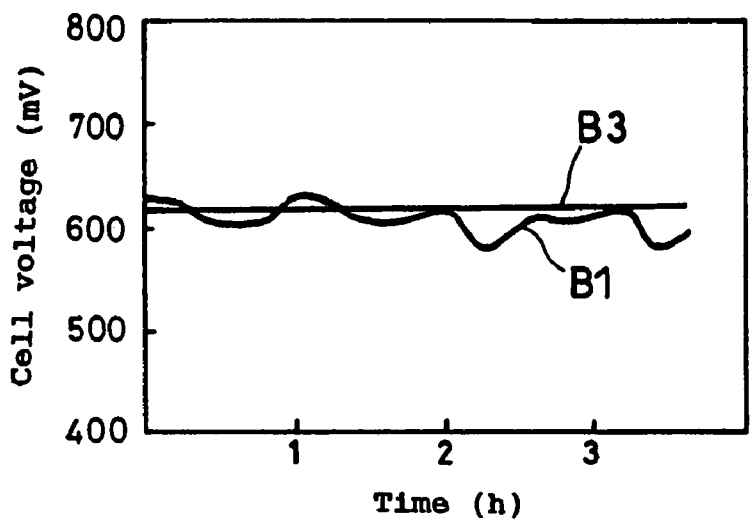
FIG. 7 is a plot indicating voltage characteristics of the same unit cells of the fuel cell stack.

FIG. 7 is a plot indicating the output voltages of the unit cells during power generation of the conventional polymer electrolyte fuel cell stack when the temperatures shown in FIG. 6 were measured. In FIG. 7, B1 and B3 represent time verses the output voltage of the cell closest to the end plate and time verses the output voltage of the third cell from the end plate, respectively. As shown by B1, voltage fluctuations and a decrease in voltage were observed in the cell closest to the end plate.

The behavior of a conventional polymer electrolyte fuel cell stack during power generation will be described with reference to FIG. 8, which shows another comparative example of the result of cell temperature measurement during power generation of a conventional polymer electrolyte fuel cell. In this example, by setting the temperature of the coolant high, the temperature of the cell closest to the end plate approached the target temperature. C1 is a plot of time verses the temperature of the cell closest to one end plate, and C3 is a plot of time verses the temperature of the third cell from the one end plate. C0 is the target value of cell temperature.

Figure 8:
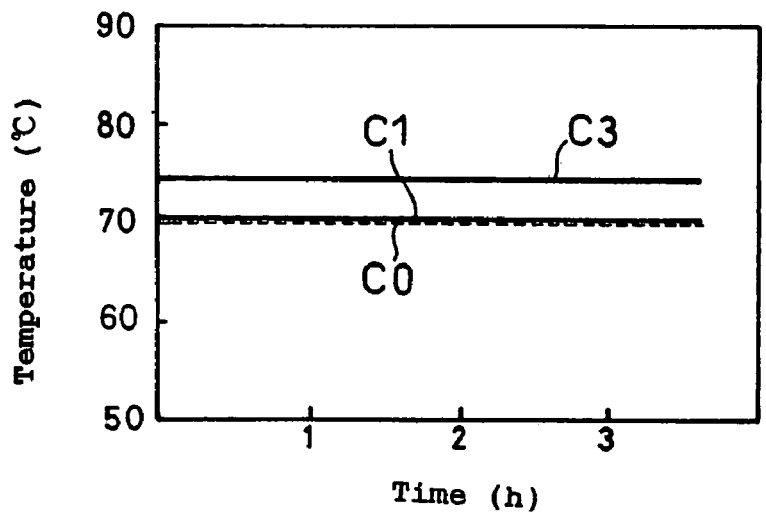
FIG. 8 is a plot indicating temperature characteristics of unit cells of another conventional polymer electrolyte fuel cell stack.
Figure 9:
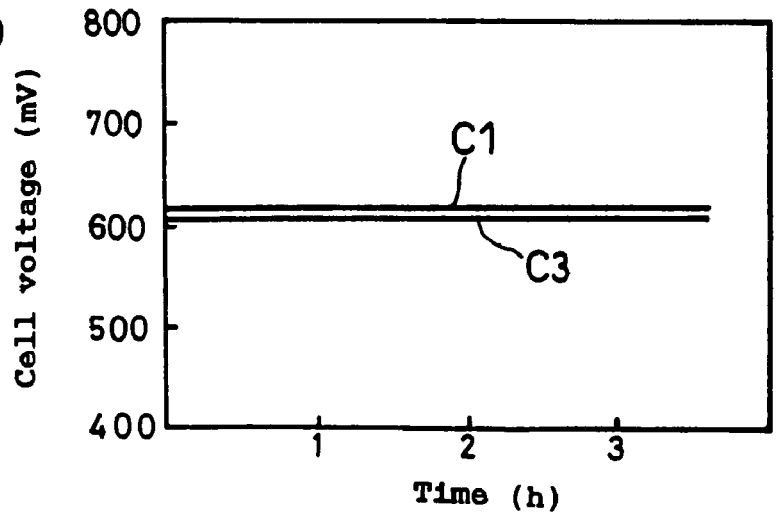
FIG. 9 is a plot indicating temperature characteristics of the same unit cells of the fuel cell stack.

FIG. 9 is a plot showing the output voltages of the unit cells during power generation of the polymer electrolyte fuel cell when the temperatures shown in FIG. 8 were measured. In FIG. 9, C1 and C3 represent time verses the output voltage of the cell closest to the end plate and time verses the output voltage of the third cell from the end plate, respectively. As shown by C1, the voltage fluctuations and decrease were eliminated in the cell closest to the end plate, but the output voltage of the cell located inside the stack was lower as shown by C3.

Example 1

This example describes the behavior of a polymer electrolyte fuel cell of the present invention during power generation. The cell stack used in this example is the same as the cell stack of Comparative Example 1, except that only the separator plates closest to the end plates on both sides have no coolant flow channel as illustrated in FIG. 1.

Figure 4:
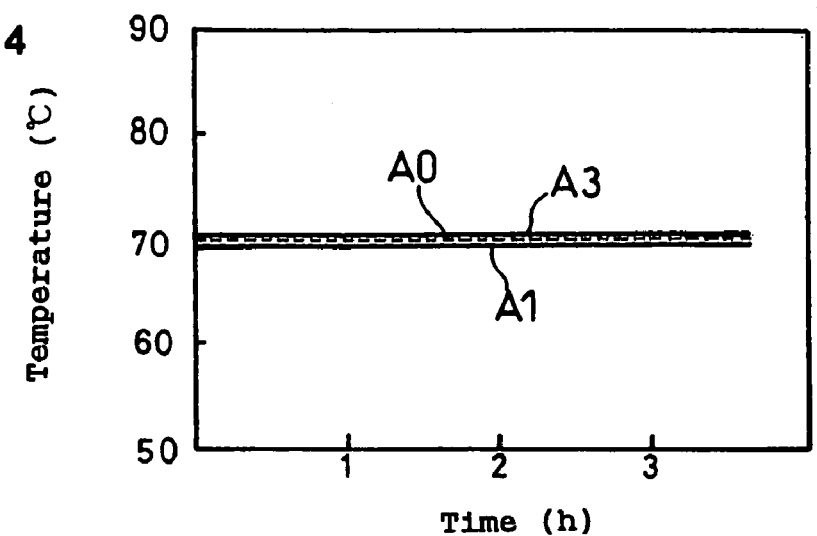
FIG. 4 is a plot indicating temperature characteristics of unit cells of a polymer electrolyte fuel cell stack in accordance with the present invention.

FIG. 4 is a plot of the results of cell temperature measurement during power generation of a polymer electrolyte fuel cell according to the present invention. A1 represents time verses the temperature of the cell closest to one end plate, and A3 represents time verses the temperature of the third cell from the one end plate. A0 represents the target value of cell temperature. The plot shows that the temperature of the cell closest to the end plate is maintained close to the temperature target value because of the balance between heat dissipation from the end plate side and heat evolution caused by power generation of the cell.

Figure 5:
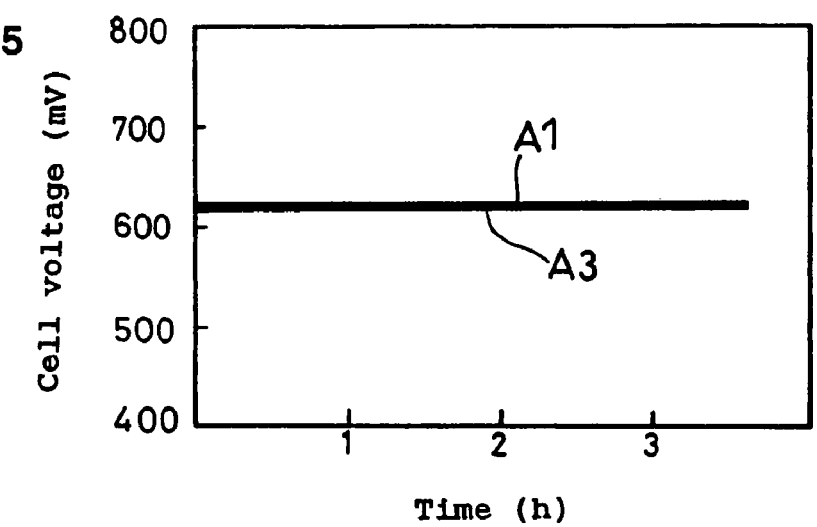
FIG. 5 is a plot indicating voltage characteristics of the same unit cells of the fuel cell stack.

FIG. 5 is a plot showing the output voltages of the unit cells during power generation of the polymer electrolyte fuel cell according to the present invention. In FIG. 5, A1 and A3 represent time verses the output voltage of the cell closest to the end plate and time verses the output voltage of the third cell from the end plate, respectively. The voltage fluctuations and decrease of the cell closest to the end plate, which were observed in the conventional polymer electrolyte fuel cell stack, were not observed.

As is clear from the foregoing examples, the stack structure of the present invention can avoid the voltage decrease of the cells closest to the end plates without affecting the output of the other cells.

Embodiment 3

Embodiments 3 and 4 will describe a method of using the fuel cell system in which the temperature of a coolant introduced into a fuel cell is varied depending on the amount of power generation of the fuel cell. The fuel cells used in this embodiment preferably comprise separator plates having such a structure as described in Embodiments 1 and 2, i.e., the structure of coolant flow channel.

Figure 10:
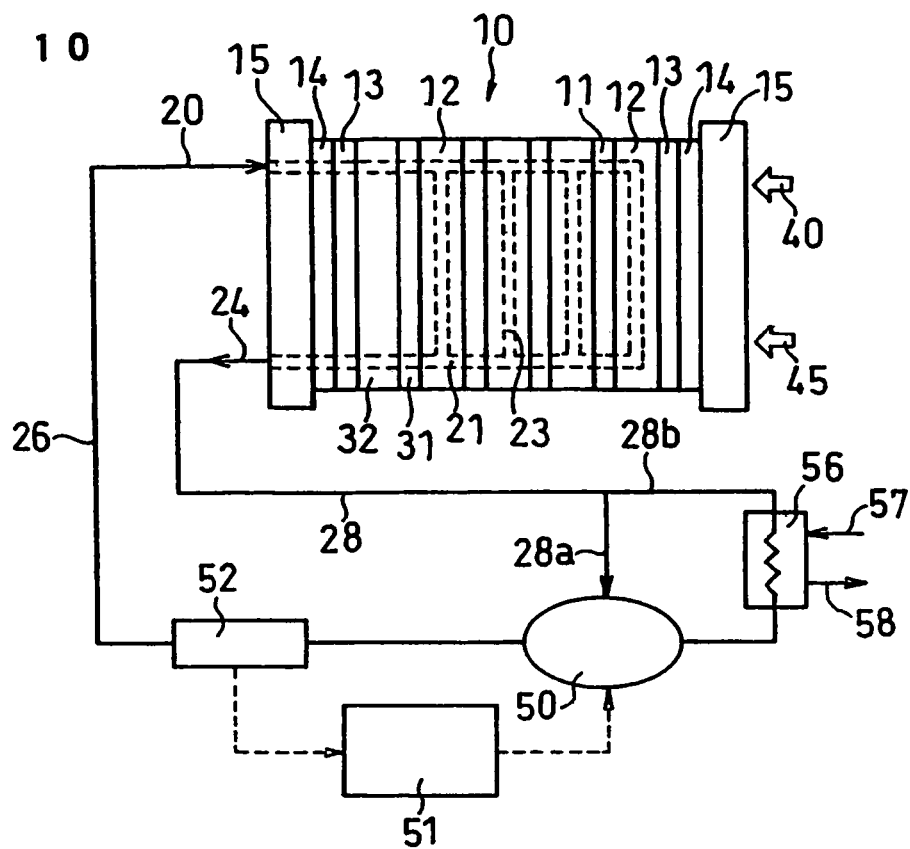
FIG. 10 is a diagram illustrating the structure of a fuel cell system in Embodiment 3 of the present invention.

The structure of a fuel cell system in this embodiment is illustrated in FIG. 10. A fuel cell stack 10 is the same as that of the above-described Embodiment 1. The fuel cell stack 10 has an oxidant gas inlet 40 and a fuel gas inlet 45 formed on the right end plate side. Coolant pipes 26 and 28 are connected to a coolant inlet 20 and a coolant outlet 24, respectively. The coolant pipe 28 branches into 28a and 28b. The pipe 28b comprises a heat exchanger 56. The pipes 28a and 28b are connected to the pipe 26 via a temperature adjusting means 50. The pipe 26 is connected to a temperature measuring means 52. The pipe 28b heats, for example, water from a hot water supply system by means of the heat exchanger 56. The water to be heated enters through inlet 57 and exits through outlet 58. The temperature adjusting means 50 adjusts the temperature of a coolant flowing through the pipe 26 by signals sent from a temperature controlling means 51 based on the temperature information from the temperature measuring means 52. The temperature adjusting means 50 adjusts the temperature of the coolant introduced into the inlet 20 of the stack 10 by adjusting the mixing ratio of the heated coolant coming from the pipe 28a and the coolant cooled by the heat exchanger 56.

Embodiment 4

Figure 11:
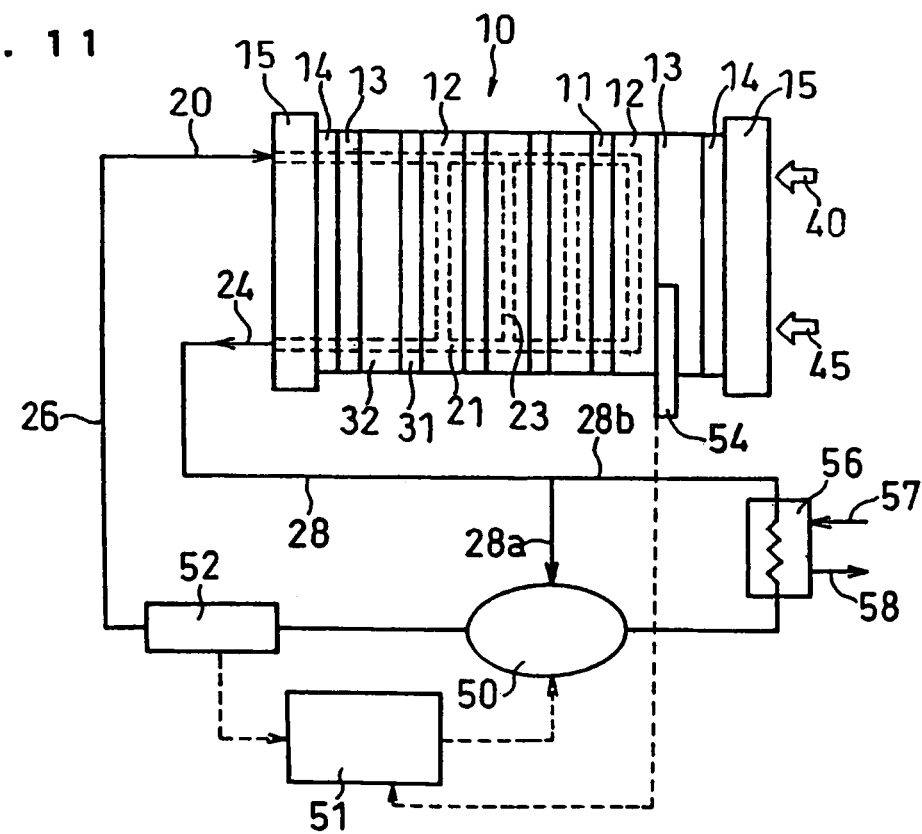
FIG. 11 is a diagram illustrating the structure of a fuel cell system in Embodiment 4 of the present invention.

FIG. 11 illustrates the structure of a fuel cell system in this embodiment. A stack temperature measuring means 54 is incorporated in a separator plate 12 at the right end of a fuel cell stack 10. A temperature controlling means 51 determines the control target temperature of the coolant temperature based on a predetermined function, the coolant temperature detected by a temperature measuring means 52, and the stack temperature detected by the temperature measuring means 54. The temperature controlling means sends control signals to a coolant temperature adjusting means 50 that adjusts the coolant temperature based on the information provided by the temperature controlling means. Accordingly, the fuel cell stack 10 is maintained at temperatures appropriate for power generation.

The fuel cell systems described in the foregoing Embodiments 3 and 4 are merely examples of the present invention, and these embodiments are not to be construed as limiting the number of cells stacked in the fuel cell stack of the present invention and the number of the separator plates having a coolant flow channel. Also, these embodiments are not to be construed as limiting the setting positions of the coolant temperature measuring means and coolant temperature adjusting means. It is also possible to provide the coolant temperature adjusting means on the fuel cell stack exit side of the coolant pipe. The coolant temperature adjusting means is not necessarily unitary. Also, the heating means and cooling means may be provided separately. Further, the insulating plate can be integrated with the end plate by imparting an insulating property to part of the end plate. The coolant temperature does not need to be raised in one operation as in the foregoing embodiments, and it may be done in a few operations. The timing for raising the coolant temperature is not necessarily concurrent with the start of power generation as in these embodiments. There may be a time lag of several minutes after starting power generation before the coolant temperature is raised.

Comparative Example 2

The changes of the temperature and cell voltage when increasing the power generation capacity of a fuel cell system of this comparative example will be described.

The cell stack is the same as that of Example 1. The temperature controlling means is set such that the temperature of the coolant flowing into the fuel cell stack is 76.3° C.

FIG. 12 is a plot of time versus the temperature of separator plates incorporated into the fuel cell stack 10 before and after an increase in power generation capacity of the fuel cell system of this comparative example.

In FIG. 12, B101 represents time verses the temperature of the separator plate closest to one end plate, B110 represents time verses the temperature of the separator plate stacked at the central portion of the fuel cell stack, and B100 represents the temperature of the coolant at the location where the coolant flows into the fuel cell stack. FIG. 12 shows that the separator plate stacked at the central portion of the fuel cell stack exhibits a considerable temperature rise with increasing power generation capacity, unlike the separator plate closest to the end plate. On the other hand, the temperature of the separator plate closest to the end plate does not rise.

FIG. 13 is a plot of the output voltage of unit cells incorporated into the above-described fuel cell stack 10. The output voltage B110 of the unit cell stacked at the central portion of the fuel cell stack drops due to the increase in current density caused by the increased power generation capacity. Thereafter, the voltage gradually decreases due to the rise of cell temperature and therefore the reduction in water content of the polymer electrolyte membrane.

Example 2

The method of operation of a system having the structure of FIG. 10 incorporating therein the same cell stack as that of Example 1 will be described. In this example, setting was made on the temperature controlling means so that the temperature of the coolant at the location where the coolant was introduced into the fuel cell stack was changed from 76.3° to 75.0° C. upon increasing the amount of power generated.

FIG. 14 is a plot of time versus the temperature of separator plates incorporated into the fuel cell stack 10 before and after an increase in power generation capacity of the fuel cell system. A101 represents time verses the temperature of the separator plate closest to one end plate, A110 represents time verses the temperature of the separator plate at the central portion of the fuel cell stack, and A100 represents the temperature of the coolant at the location where the coolant flows into the fuel cell stack. FIG. 14 shows that the temperature of each cell is, unlike Comparative Example 2, maintained at an appropriate temperature because of the decrease in coolant temperature upon the increase in power generation capacity.

FIG. 15 is a plot of the output voltage of unit cells incorporated into the fuel cell stack 10 from at the time of non-power generation during operation of the fuel cell system until after a lapse of a certain time from the start of power generation. The drop in output voltage A110 of the unit cell at the central portion of the fuel cell stack is small when compared to B110 of FIG. 13. Presumably, this is because the rise in cell temperature could be suppressed by the effects of the present invention.

Comparative Example 3

The changes of the temperature and cell voltage when decreasing the power generation capacity of the same fuel cell system as that of Comparative Example 2 will be described. The temperature controlling means is set such that the temperature of the coolant flowing into the fuel cell stack is 75.0° C.

Figure 16:
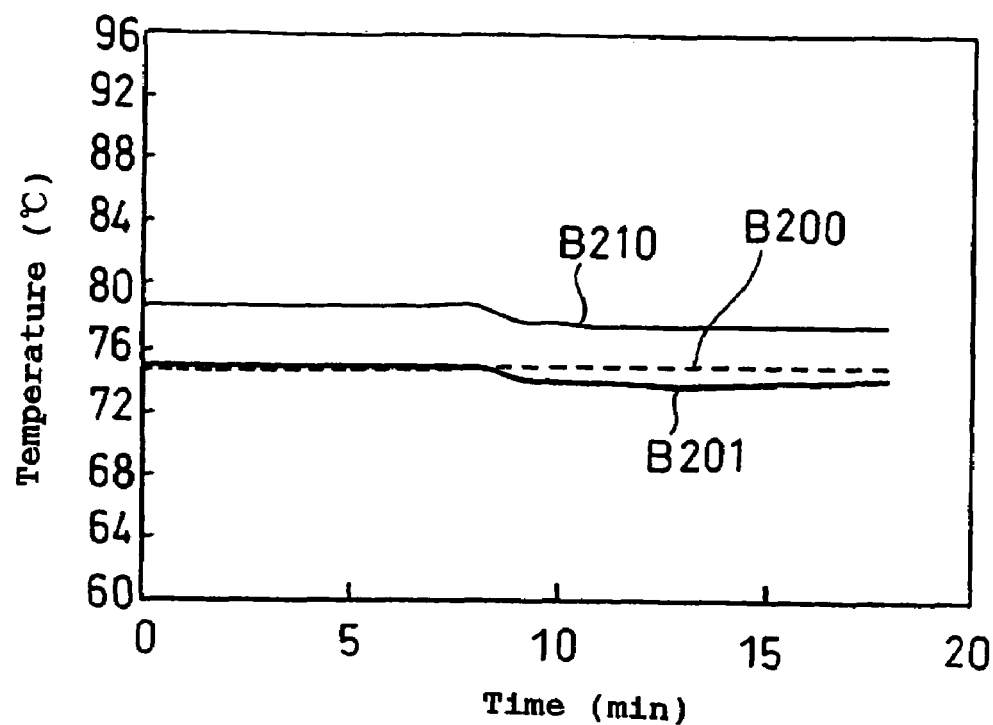
FIG. 16 is a plot indicating cell temperature characteristics of a fuel cell system in Comparative Example 3.

FIG. 16 is a plot of time versus the temperature of the separator plates incorporated into the fuel cell stack 10 before and after a decrease in power generation capacity. B201 represents the temperature of the separator plate closest to one end plate, B210 represents the temperature of the separator plate stacked at the central portion of the fuel cell stack, and B200 represents the temperature of the coolant at the location where the coolant flows into the fuel cell stack. FIG. 16 shows that the separator plate closest to the end plate exhibits a considerable temperature decrease with decreasing power generation capacity, unlike the separator plate at the central portion of the fuel cell stack. The temperature of the separator plate stacked at the central portion also decreases with decreasing power generation capacity.

Figure 17:
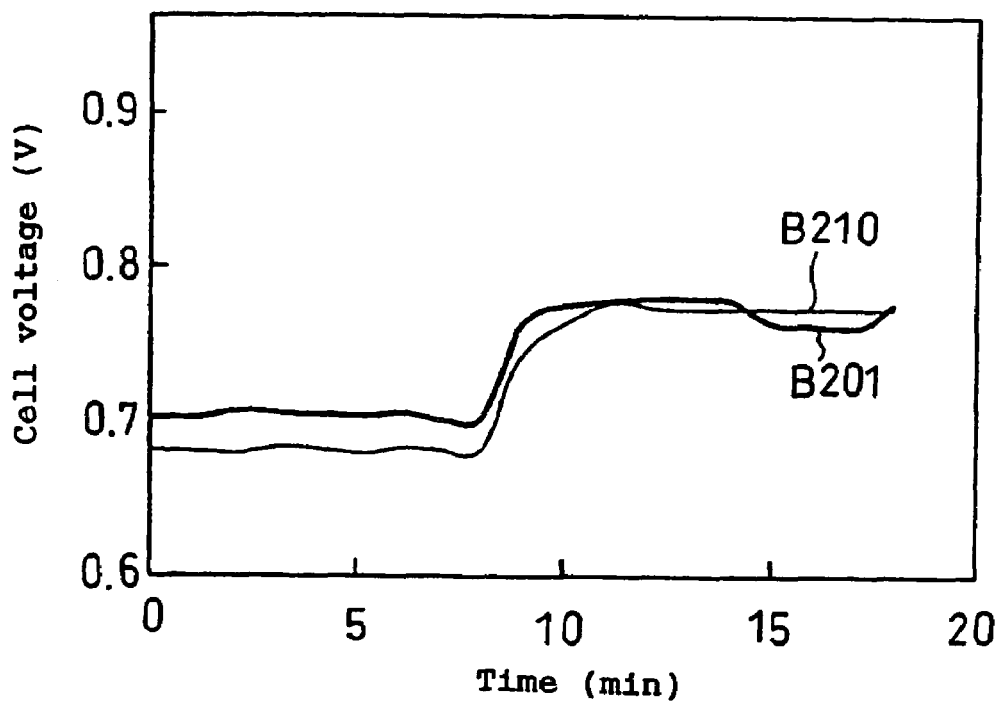
FIG. 17 is a plot indicating cell voltage characteristics of the fuel cell system in Comparative Example 3.

FIG. 17 is a plot of time versus the output voltage of unit cells incorporated into the fuel cell stack 10 before and after the decrease in power generation capacity. The output voltage B201 of the unit cell closest to the end plate is unstable because condensation occurred in the oxidant gas flow channel due to the temperature decrease caused by the decreased power generation capacity.

Example 3

The same fuel cell system as that of Example 2 was used. The temperature controlling means was set so that the temperature of the coolant at the location where the coolant was introduced into the fuel cell stack was changed from 75.0° to 76.3° C. upon decreasing the amount of power generated by the fuel cell.

Figure 18:
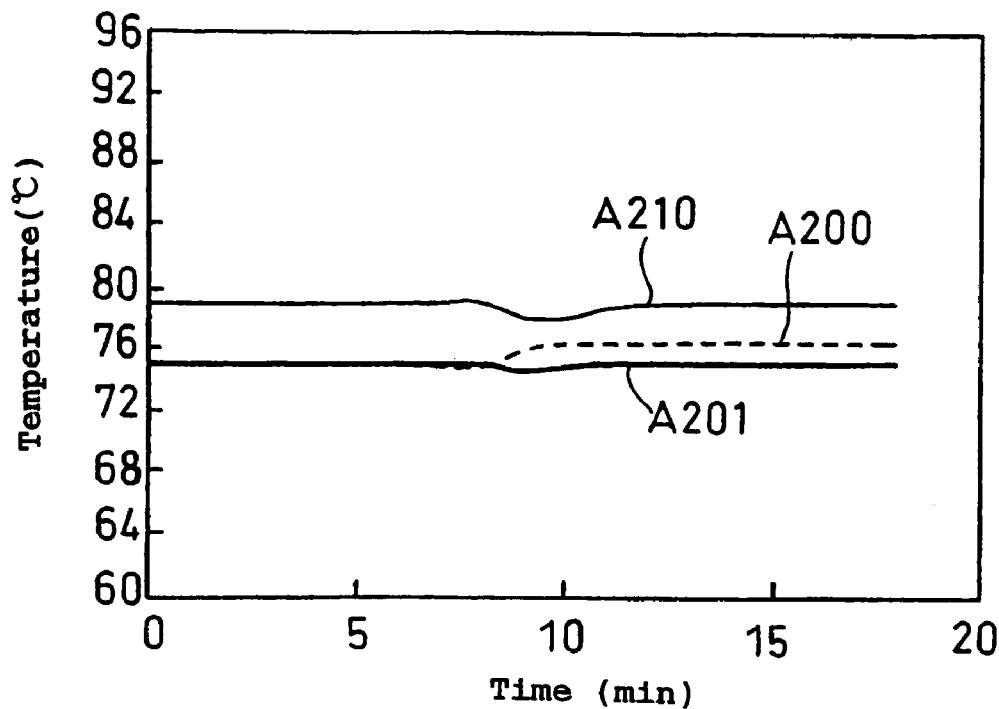
FIG. 18 is a plot indicating cell temperature characteristics of a fuel cell system in Example 4.

FIG. 18 is a plot of time versus the temperature of the separator plates incorporated into the fuel cell stack 10 before and after a decrease in power generation capacity of the fuel cell system. A201 represents the temperature of the separator plate closest to one end plate, A210 represents the temperature of the separator plate at the central portion of the fuel cell stack, and A200 represents the temperature of the coolant at the location where the coolant flows into the fuel cell stack. FIG. 18 indicates that the temperature of each cell is, unlike Comparative Example 3, maintained at an appropriate temperature because of the increase in coolant temperature upon the decrease in power generation capacity.

Figure 19:
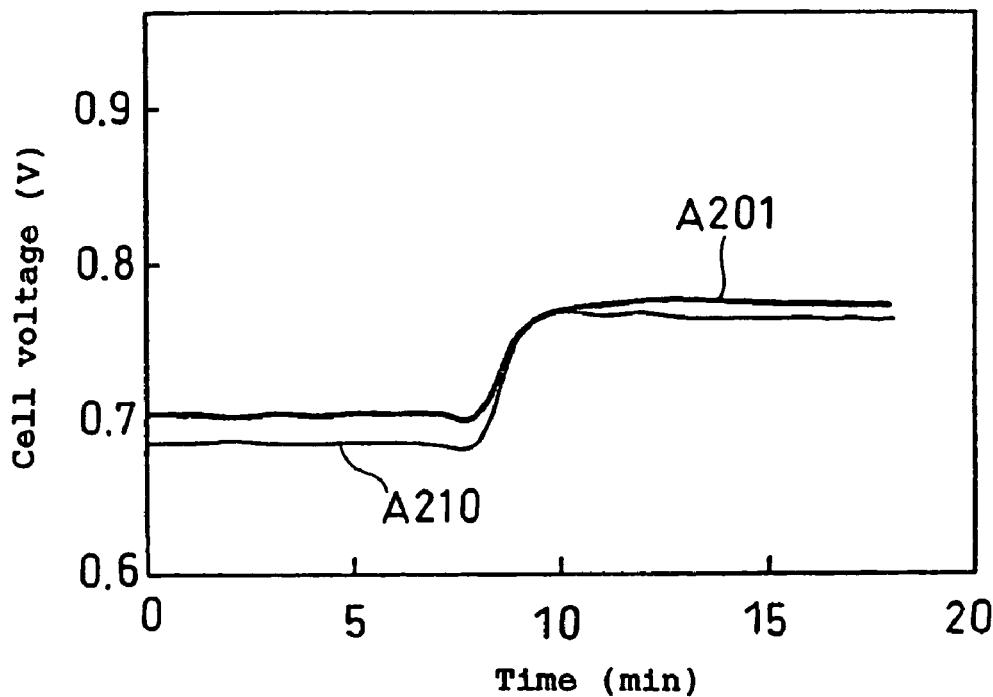
FIG. 19 is a plot indicating cell voltage characteristics of the fuel cell system in Example 4.

FIG. 19 is a plot of time versus the output voltage of unit cells incorporated into the fuel cell stack 10 from at the time of non-power generation during operation of the fuel cell system until after a lapse of a certain time from the start of power generation. The output voltage A201 of the unit cell closest to the end plate is stable. Presumably, this is because of the effects of the present invention. No condensation occurred in the oxidant gas flow channel in the unit cell closest to the end plate. The power output A210 of the unit cell at the center exhibits a slightly lower value in comparison with B201 of FIG. 17. This is because the rise of the coolant temperature induced a decrease in water content of the polymer electrolyte membrane in the cell. However, this can prevent the large output drop caused by condensation in the oxidant gas flow channel. Further, the degree of the output drop can be reduced sufficiently by appropriately adjusting how much the coolant temperature is increased upon the decrease in power generation capacity.

In increasing or decreasing the power generation capacity, it is difficult to unconditionally specify the degree the coolant temperature will be raised or lowered since the temperature varies depending on the specifications of each system such as the amount of power generated, the flow rate of the coolant and the area of the cell. There is no problem if settings are made such that the temperature difference between before and after the change of the power generation capacity of the unit cell closest to the end plate is within 2° C., and more preferably within approximately 1° C.

Embodiment 5

Embodiments 5, 6 and 7 below are directed to a fuel cell and a method of use capable of eliminating water clogging occurring inside a cell stack in a simple and reliable manner. The fuel cells used in these embodiments preferably comprise separator plates having such a structure as described in Embodiments 1 and 2.

Figure 20:
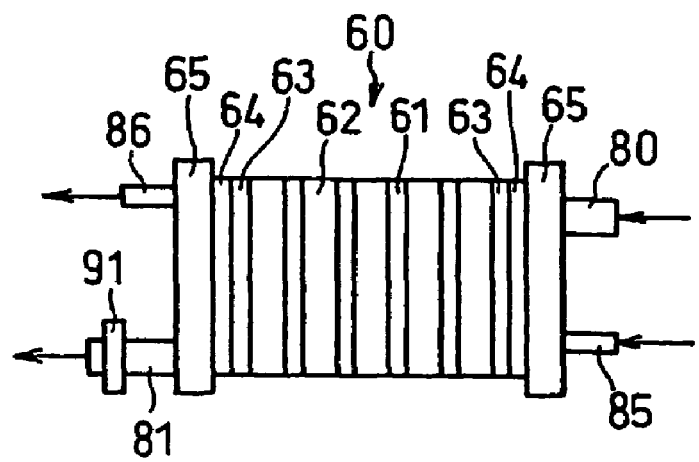
FIG. 20 is a diagram illustrating the structure of a fuel cell system in Embodiment 5 of the present invention.

FIG. 20 illustrates the structure of a polymer electrolyte fuel cell of Embodiment 5.

A fuel cell stack 60 has a structure in which MEAs 61 and separator plates 62 are stacked alternately. This stack further includes a current collector plate 63 and an insulating plate 64 disposed on each end of the stack. The stack, current collector place 63 and inulating plate 64 are sandwiched by end plates 65. The resultant stack is clamped by clamping members (not shown) with a predetermined load. The end plates 65 are provided with an oxidant gas inlet portion 80 and a fuel gas inlet portion 85, to which an oxidant gas and a fuel gas are supplied respectively from a gas supply apparatus (not shown). The fuel cell further includes a gas outlet portion 86 and an oxidant gas outlet portion 81 from which the fuel gas and the oxidant gas are discharged, respectively.

Figure 21:
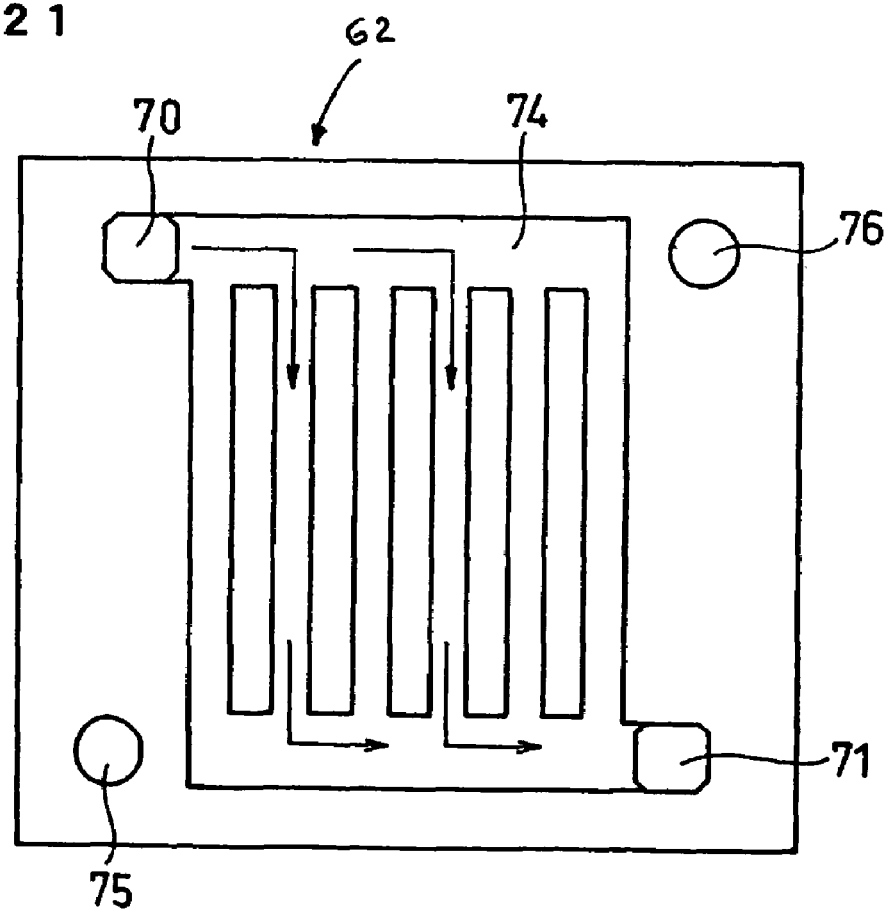
FIG. 21 is a front view of the cathode side of a separator plate of the fuel cell in Embodiment 5 of the present invention.

As illustrated in FIG. 21, the separator plate 62 comprises an oxidant gas inlet-side manifold aperture 70 and an oxidant gas outlet-side manifold aperture 71. The separator plate further includes a fuel gas inlet-side manifold aperture 75, a fuel gas outlet-side manifold aperture 76, and a gas flow channel 74 communicating with the manifold apertures 70 and 71 formed on the cathode-facing side thereof. On the other side of the separator plate 62 is formed a fuel gas flow channel. The separator plate having a coolant flow channel used is, for example, a composite separator plate obtained by bonding a cathode-side separator plate, which has an oxidant gas flow channel on one side and a coolant flow channel on the other side, and an anode-side separator plate, which has a fuel gas flow channel on one side and a coolant flow channel on the other side, together in such a manner that their sides having the coolant flow channel face each other. In FIG. 21, coolant manifold apertures are omitted.

The oxidant gas outlet portion 81 is provided with a valve 91. However, if there is an exhaust pipe connected to the oxidant gas outlet portion 81, the valve 91 may be installed within the exhaust pipe. The valve 91 may be installed at any location on the exhaust path of the oxidant gas discharged outside from the outlet-side manifold. Also, the present invention is applicable not only to the above-described internal manifold type having manifold apertures formed inside the separator plates, but also to the external manifold type having manifold apertures formed outside the separator plates.

When this polymer electrolyte fuel cell is operated for a long time, water clogs the oxidant gas flow channels and diffusion layers causing the cell voltage to lower gradually. By closing the valve 91 for a predetermined time and opening the valve again, water can be discharged with the oxidant gas at a high flow rate from the outlet side of the oxidant gas. The predetermined time of valve closing is preferably 1 to 20 seconds.

Example 4

A cathode catalyst was prepared by placing platinum particles having an average particle size of approximately 30 Å in a weight ratio of 50:50 on conductive carbon particles having an average primary particle size of 30 μm, Ketjen Black EC (manufactured by AKZO Chemie Company of the Nederlands). An anode catalyst was prepared by placing platinum particles and ruthenium particles, each having an average particle size of approximately 30 Å, in a weight ratio of 25:25:50, on Ketjen Black EC carbon particles having an average primary particle size of 30 nm. A dispersion of each of these catalysts in isopropanol was mixed with a dispersion of perfluorocarbon sulfonic acid powder in ethyl alcohol to form a paste. The paste containing the cathode catalyst was applied by screen printing onto one side of a 250 μm thick carbon fiber nonwoven fabric to form a cathode catalyst layer. The paste containing the anode catalyst was applied by screen printing onto one side of another 250 μm thick carbon fiber nonwoven fabric to form an anode catalyst layer. In each of the catalyst layers, the content of catalyst metal was 0.5 mg/cm$^2$, and the content of perfluorocarbon sulfonic acid was 1.2 mg/cm$^2$.

Subsequently, the nonwoven fabric containing the anode catalyst layer and the nonwoven fabric containing the cathode catalyst layer were bonded by hot pressing to the center part of a hydrogen-ion conductive polymer electrolyte membrane such that the anode catalyst layer bonded to one side of the membrane and the cathode catalyst layer bonded to the opposite side of the membrane. The conductive polymer electrolyte membrane has an area slightly larger than that of the anode and cathode in such a manner that the catalyst layers sufficiently adhered to the electrolyte membrane. The hydrogen-ion conductive polymer electrolyte was a thin film of perfluorocarbon sulfonic acid (Nafion 112 manufactured by E.I. Du Pont de Nemours & Co. Inc. of the United State). Further, gaskets, punched out into the same shape as that of the separator plate, were bonded by hot pressing to the electrolyte membrane so as to sandwich the electrolyte membrane which was positioned on the outer periphery of the electrodes, whereby an MEA (membrane-electrode assembly) was produced.

The operation of the polymer electrolyte fuel cell of this example is described with reference to FIG. 24. The conditions of the experiment included the use of a simulated reformed gas (80% hydrogen by volume, 20% carbon dioxide by volume, and 50 ppm carbon monoxide) as a fuel gas and air as an oxidant gas. The fuel gas, humidified and heated to have a dew point of 75° C., and the air, humidified and heated to have a dew point of 50° C., were supplied to the fuel cell.

Characteristic testing was performed under the conditions of a fuel utilization rate of 80%, oxygen utilization rate of 50%, cell temperature of 75° C. and current density of 0.3 A/cm². The fuel cell stack has the same structure as that as described in Example 1.

Figure 24:
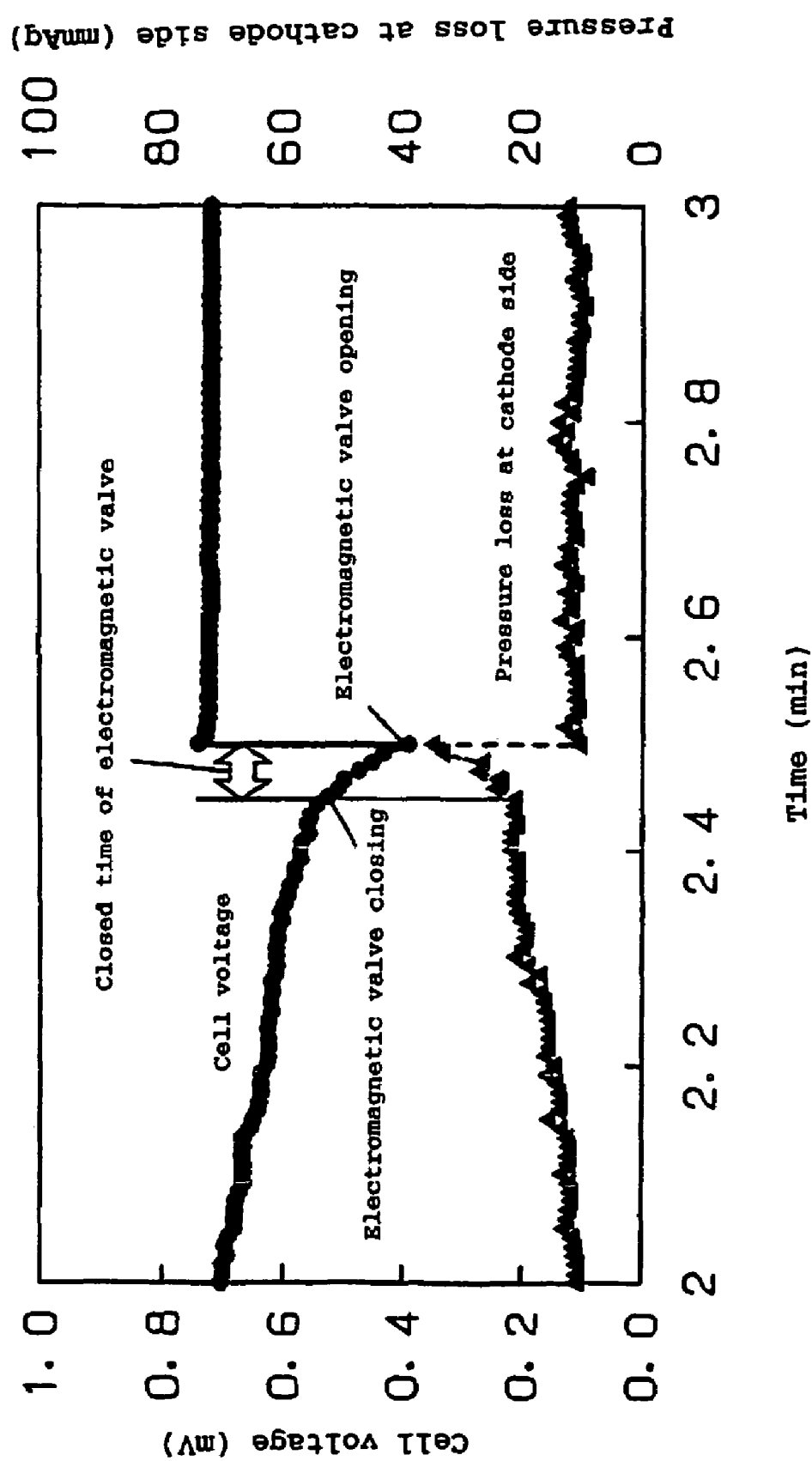
FIG. 24 is a plot indicating cell behavior and pressure loss behavior of a fuel cell system in Example 4.

FIG. 24 is a graph showing the changes in cell voltage and cathode-side pressure loss upon opening and closing the valve 91 during the operation of the fuel cell under the above-mentioned conditions. When the valve 91 which had been open was closed, the pressure loss increased as expected naturally, thereby making supply of the oxidant gas difficult, so that the cell voltage decreased gradually. Then, when the valve 91 was opened again approximately 8 seconds after the closing of the valve 91, the oxidant gas was discharged at a high flow rate from the cathode side, and at the same time, the water accumulated in the cell was discharged. As a result, it was found that the cell voltage made an instant recovery and exceeded the voltage value before the closing of the valve 91. This demonstrates that the cell voltage lowered by water clogging or the like can be restored in a short time and in a reliable manner by closing the valve installed on the exhaust path of the oxidant gas for a predetermined time and opening the valve again.

The predetermined time of valve closing is preferably 1 to 20 seconds. If the time is shorter than one second, cell voltage recovery cannot be obtained. If it is longer than 20 seconds, a problem of the cell voltage drop becoming larger arises. The cell voltage monitored in this embodiment is that of the unit cell.

Embodiment 6

Figure 22:
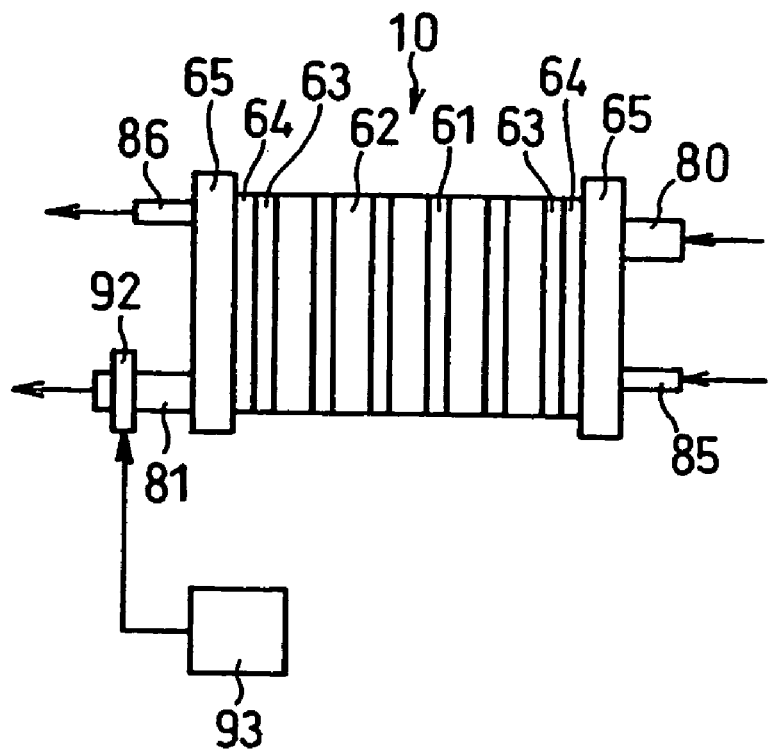
FIG. 22 is a diagram illustrating the structure of a fuel cell system in Embodiment 6 of the present invention.

The cell structure of this embodiment is illustrated in FIG. 22. It is the same as that of Embodiment 5, except for the use of an electromagnetic valve 92 in place of the valve 91 and the addition of an electromagnetic valve open/close controlling means 93 for controlling the opening and closing of the electromagnetic valve. The electromagnetic valve open/close controlling means 93 was furnished with a controlling function by means of a computer. However, it may be furnished with a controlling function by means of an analogue circuit comprising a comparator or the like.

With this fuel cell, a series of operations of closing the electromagnetic valve for a predetermined time and opening the electromagnetic valve again can be performed periodically and automatically to prevent the cell voltage from lowering too much. It is therefore possible to suppress performance deterioration occurring in a continuous operation over an extended period of time.

Embodiment 7

Figure 23:
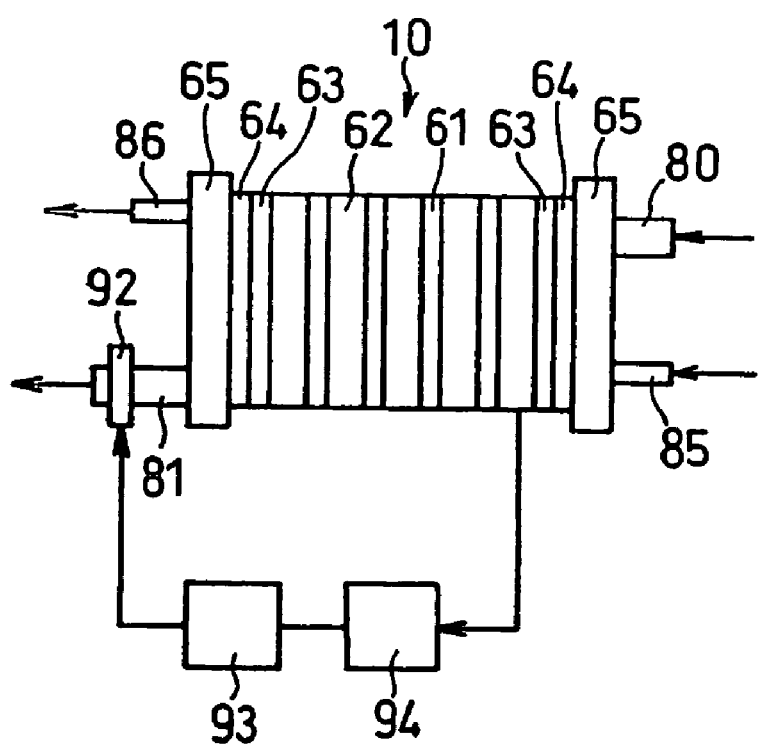
FIG. 23 is a diagram illustrating the structure of a fuel cell system in Embodiment 7 of the present invention.

The cell structure of this embodiment is illustrated in FIG. 23. It is the same as that of Embodiment 6, except that a voltage detecting means 94 for detecting cell voltage is included such that when the voltage detected by this voltage detecting means becomes lower than a predetermined threshold value, an electromagnetic valve open/close controlling means 93 closes a valve 92 for a predetermined time. A common voltage measuring terminal was used for the voltage detecting means 94, but an AD converter or the like may also be used.

With regard to the operation of the electromagnetic valve open/close controlling means 93, there are two methods. The first method closes the valve when the cell voltage becomes lower than the valve close threshold value and opens the valve after a lapse of a predetermined time. The second method closes the valve when the cell voltage becomes lower than the valve close threshold value and opens the valve when the cell voltage becomes lower than the valve open threshold value. The valve close threshold value is preferably in a range of 0.55 to 0.65 V/cell. The valve open threshold value is preferably 0.3 V to 0.5 V/cell.

Example 5

Figure 25:
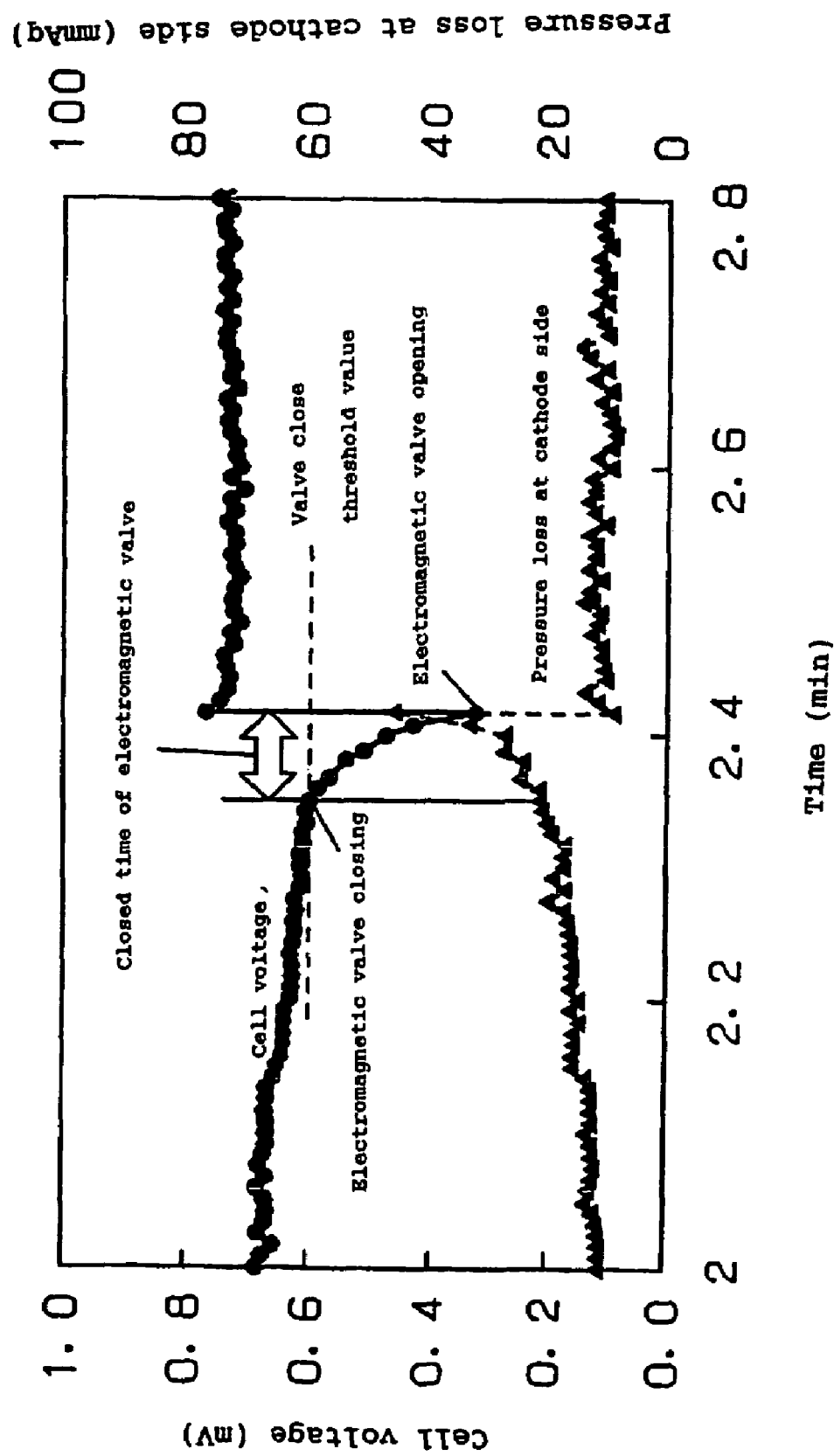
FIG. 25 is a plot indicating cell behavior and pressure loss behavior of a fuel cell system in Example 5.

FIG. 25 shows the behavior of cell voltage when the fuel cell was operated under the same conditions as those of Example 4, except for the use of the first method in which the valve operating threshold value was set to 0.6 V/cell. As the time elapsed, water gradually clogged the cell, so that the cell voltage detected by the voltage detecting means 94 was lowered. When the cell voltage reached the valve close threshold value 0.6 V/cell or lower, the electromagnetic valve 92 was closed by the output of the electromagnetic valve open/close controlling means 93, and after a lapse of approximately 12 seconds, the electromagnetic valve was opened again. As a result, water in the cell was discharged, and the cell voltage was improved in comparison with before the closing of the electromagnetic valve. The valve close threshold value is preferably in a range of 0.55 to 0.65 V/cell. When the threshold value is lower than this range, sufficient elimination of water clogging becomes difficult. When it is higher, the electromagnetic valve opens and closes frequently, which is not preferable. The closing time of the electromagnetic valve is preferably 1 to 20 seconds in the same manner as in Example 4.

As described above, the electromagnetic valve open/close controlling means 93 controls the timing of closing the electromagnetic valve 91 by comparing the cell voltage monitored by the voltage detecting means 94 with the valve close threshold value. After the closing of the electromagnetic valve 92, it exercises control such that the electromagnetic valve is opened after a lapse of the predetermined time. Therefore, it becomes possible to automatically open and close the electromagnetic valve with adequate timing and to ensure stable performance even in a long-time continuous operation.

Example 6

Figure 26:
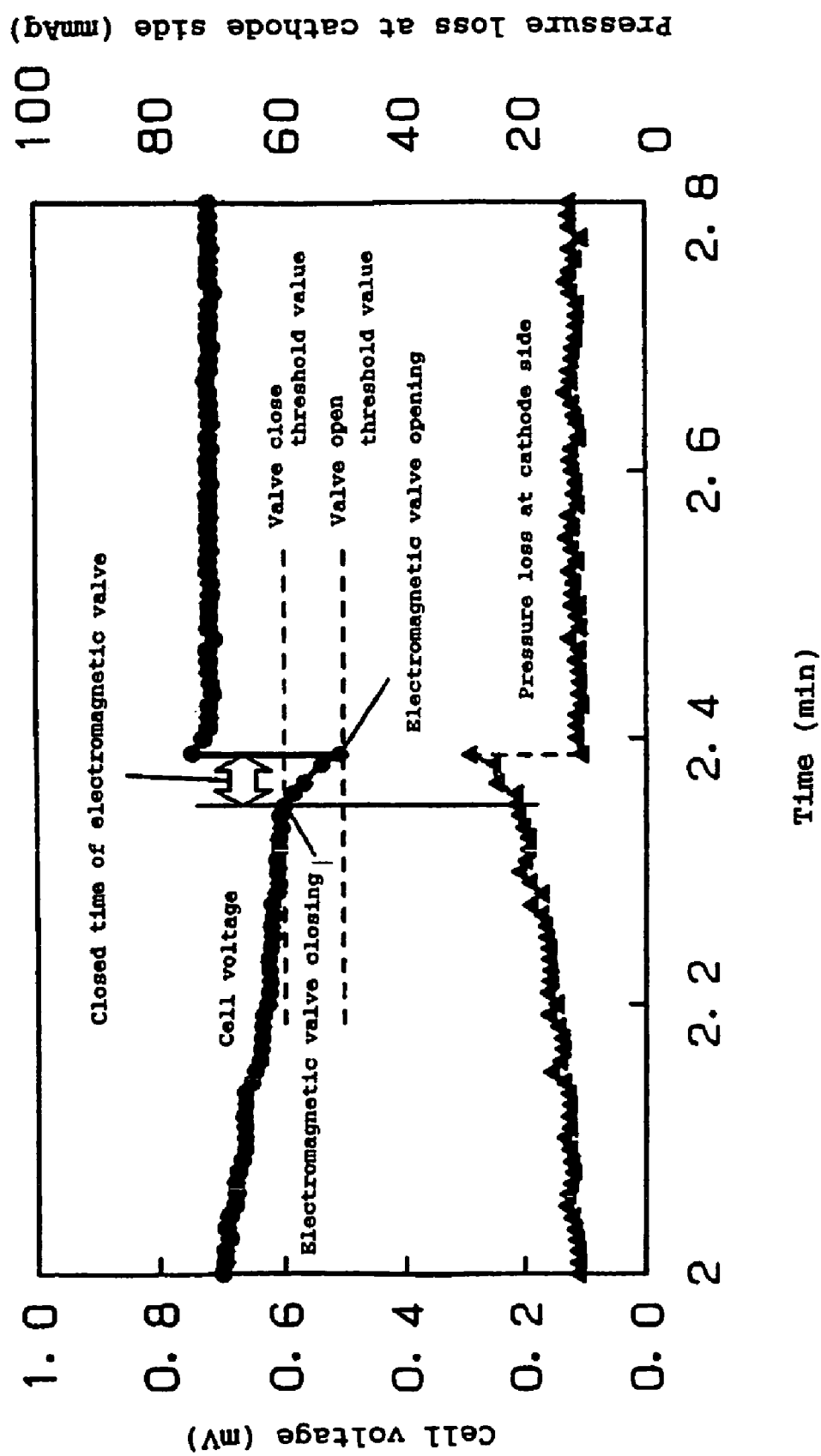
FIG. 26 is a plot indicating cell behavior and pressure loss behavior of a fuel cell system in Example 6.

Next, FIG. 26 indicates the behavior of cell voltage in the second method. The conditions of the experiment were the same as those of Example 4. When the operation of the cell was continued for a long time, water clogging gradually occurred in the cell, so that the cell voltage was lowered. When the cell voltage detected by the voltage detecting means 94 reached the valve close threshold value 0.6 V/cell or lower, the electromagnetic valve 92 was closed by the output of the electromagnetic valve open/close controlling means 93. When the cell voltage reached the valve open threshold value 0.5 V/cell or lower, the electromagnetic valve 92 was opened again by the output of the electromagnetic valve open/close controlling means 93. As a result, water in the cell was discharged, and the cell voltage was improved in comparison with before the closing of the electromagnetic valve 92. The valve close threshold value is preferably in a range of 0.55 to 0.65 V/cell, as described above. The valve open threshold value is preferably 0.3 to 0.5 V/cell. When the valve open threshold value is higher than this range, elimination of water clogging becomes insufficient and thus sufficient effects of cell voltage recovery cannot be obtained. When it is lower, the cell voltage drop becomes larger.

As described above, the electromagnetic valve open/close controlling means 93 not only controls the timing of closing the electromagnetic valve 92 by comparing the cell voltage monitored by the voltage detecting means 94 with the valve close threshold value, but also controls, after the closing of the electromagnetic valve 92, the timing of opening the electromagnetic valve by comparing the cell voltage monitored by the voltage detecting means 94 with the valve open threshold value. Therefore, in comparison with the first method, it is possible to prevent the cell voltage from dropping extremely while the electromagnetic valve is closed. Hence it is possible to automatically open and close the electromagnetic valve with more adequate timing and to ensure stable performance even in a long-time continuous operation.

In Examples 5 and 6, the valve open/close controlling means 93 controlled the electromagnetic valve 92 such that it was closed when the cell voltage detected reached the valve close threshold value or lower. However, it may also control the electromagnetic valve 92 such that it is closed at intervals in which the cell voltage is expected to reach the valve close threshold value. The voltage detecting means 94 monitored the voltage value of one unit cell. However, it may also monitor the voltage of a cell stack or the total voltage value of a plurality of unit cells such as the voltage of every four cells.

Embodiment 8

Embodiments 8 to 12 will describe a fuel cell in which condensation-induced mist is effectively discharged to prevent the occurrence of uneven gas distribution to each cell due to the mist. When a fuel cell is operated for a long period of time, condensation occurs at portions close to end plates. Mist, induced by the condensation, enters gas supply channels to cause clogging thereof. Then, gas distribution becomes uneven between the cells with a clogged gas supply channel and the cells without clogging. The means for solving this problem is detailed below. The fuel cells used in these embodiments preferably comprise separator plates having such a structure as described in Embodiments 1 and 2, i.e., the structure of coolant flow channel.

Figure 27:
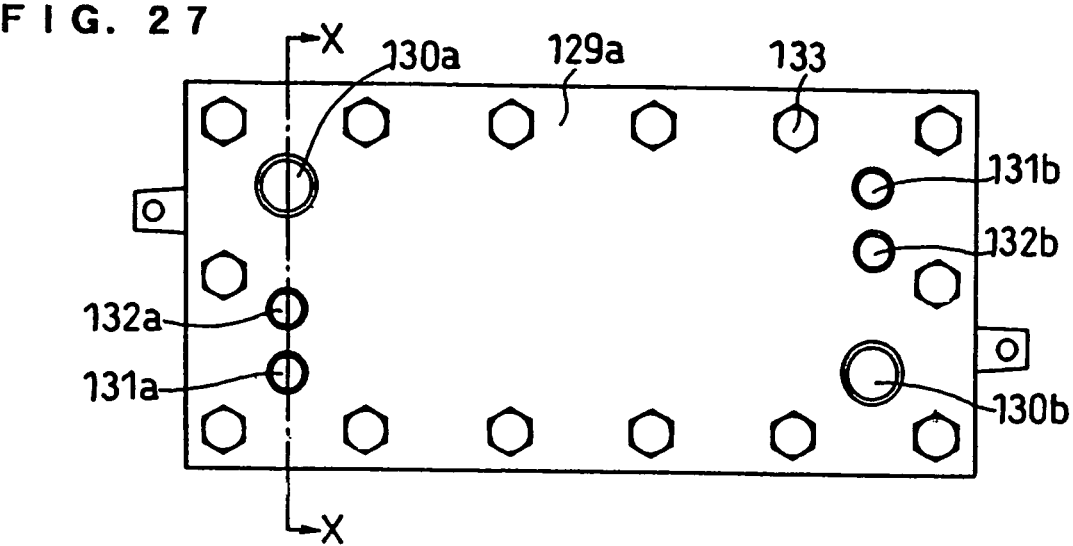
FIG. 27 is a top view of a fuel cell in Embodiment 8 of the present invention.
Figure 28:
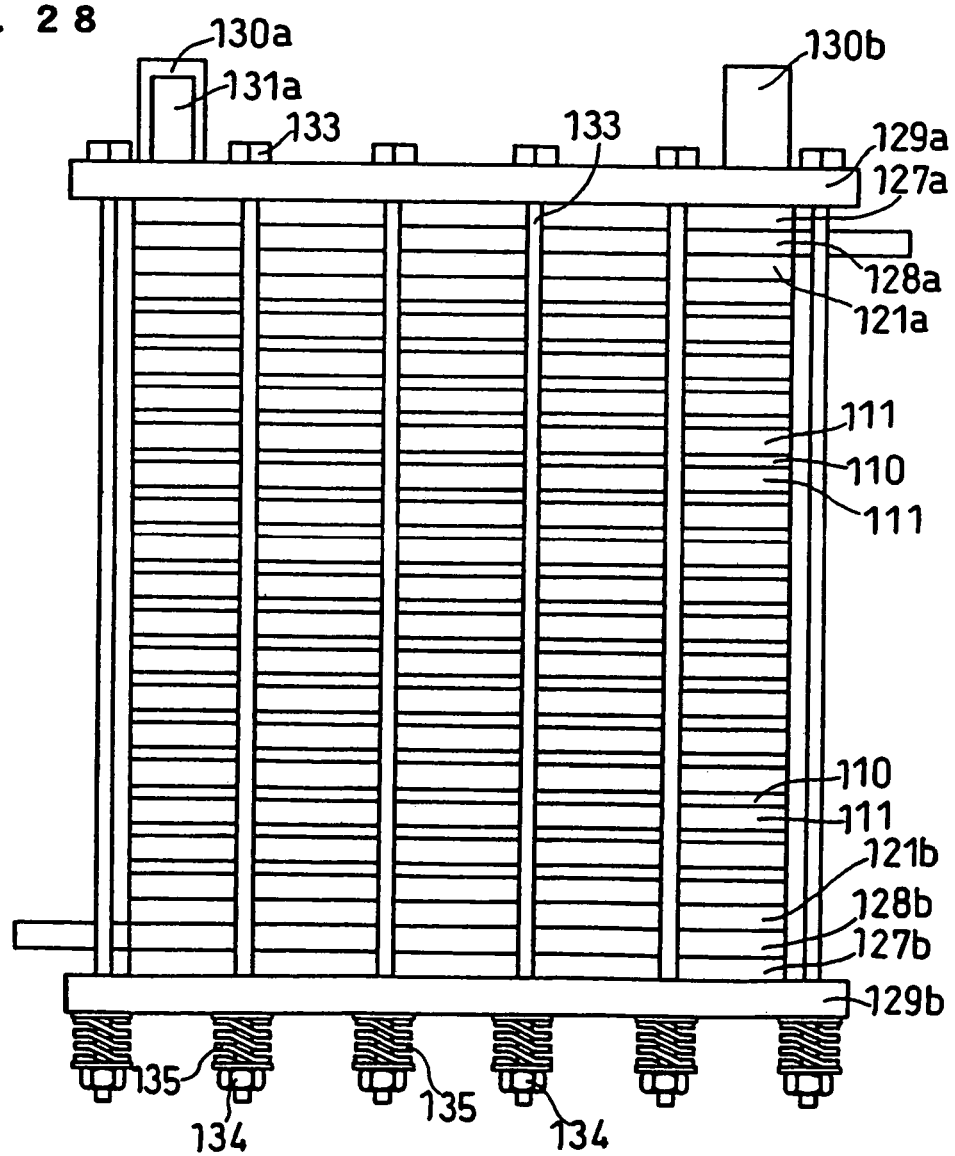
FIG. 28 is a front view of the fuel cell in Embodiment 8 of the present invention.
Figure 29:
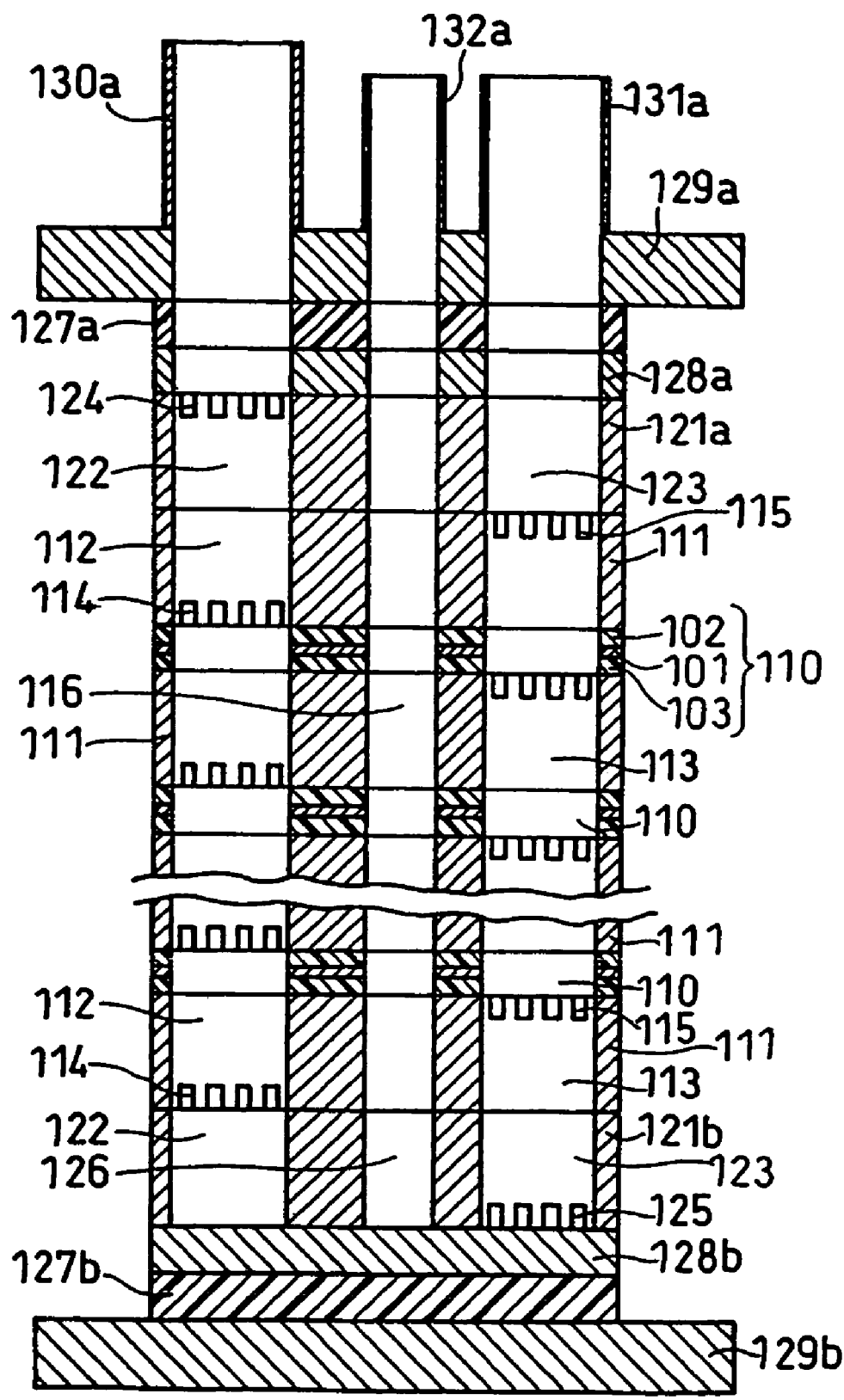
FIG. 29 is a cross sectional view cut of the fuel cell in Embodiment 8 of the present invention along line X-X of FIG. 27.

FIG. 27 is a plane view of a fuel cell in this embodiment. FIG. 28 is a front view thereof. FIG. 29 is a cross-sectional view cut along the line X-X of FIG. 27.

A membrane-electrode assembly (MEA) is represented by 110. The MEA 110 is composed of a polymer electrolyte membrane 101, a pair of electrodes (not shown) sandwiching the membrane, and gaskets 102 and 103 sandwiching the electrolyte membrane on the periphery of the electrodes. A plurality of MEAs 110 are stacked with conductive separator plates 111 interposed therebetween to form a stack of unit cells. The separator plate 111 has a gas flow channel 114 for supplying an oxidant gas to the cathode on one side, and has a gas flow channel 115 for supplying a fuel gas to the anode on the other side. The separator plate 111 serves both as a cathode-side separator plate and as an anode-side separator plate. In this example, separator plates 121a and 121b are additionally provided at the ends of the cell stack. Current collector plates 128a and 128b, insulating plates 127a and 127b, and end plates 129a and 129b are provided outside. The end plates 129a and 129b are joined by clamping means composed of a plurality of bolts 133, nuts 134 screwed to the ends thereof, and springs 135 to clamp the cell stack. This cell is covered with a heat insulating material which is not shown.

The separator plates 111 and 121a, 121b are provided with oxidant gas manifold apertures 112 and 122 and fuel gas manifold apertures 113 and 123, respectively. The MEAs 110, current collector plate 128a, insulating plate 127a and end plate 129a comprise manifold apertures communicating with the above-mentioned respective manifold apertures. The oxidant gas is introduced into these manifold apertures from an oxidant gas inlet pipe 130a installed to the end plate 129a. The oxidant gas is supplied from the gas flow channels 114 of the separator plates 111 to the cathodes and is discharged to outside from an oxidant gas discharge pipe 130b via outlet-side manifold apertures (not shown). Likewise, the fuel gas is introduced into the manifold apertures 113 and 123 from a fuel gas inlet pipe 131a installed to the end plate 129a, is supplied from the gas flow channels 115 of the separator plates 111 to the anodes and is discharged to outside from a fuel gas discharge pipe 131b via outlet-side manifold apertures (not shown).

Also, the separator plates 111 and 121a, 121b are provided with cooling water manifold apertures 116 and 126. The MEAs 110, current collector plate 128a, insulating plate 127a and end plate 129a comprise manifold apertures communicating with the above-mentioned manifold apertures. Cooling water is introduced into these manifold apertures from a cooling water inlet pipe 132a installed to the end plate 129a. The cooling water flows through cooling sections for cooling predetermined unit cells and is discharged to outside from a discharge pipe 132b via outlet-side manifold apertures. In the example shown in the figure, the cooling sections are omitted.

The separator plate 121a is located between the separator plate 111 at the end of the cell stack and the current collector plate 128a. It has, on its side contacting the current collector plate 128a, a mist discharge groove 124 communicating with the oxidant gas manifold apertures 122. Likewise, the separator plate 121b is located between the separator plate 111 at the end of the cell stack and the current collector plate 128b. It has, on its side contacting the current collector plate 128b, a mist discharge groove 125 communicating with the fuel gas manifold apertures 123.

Figure 30:
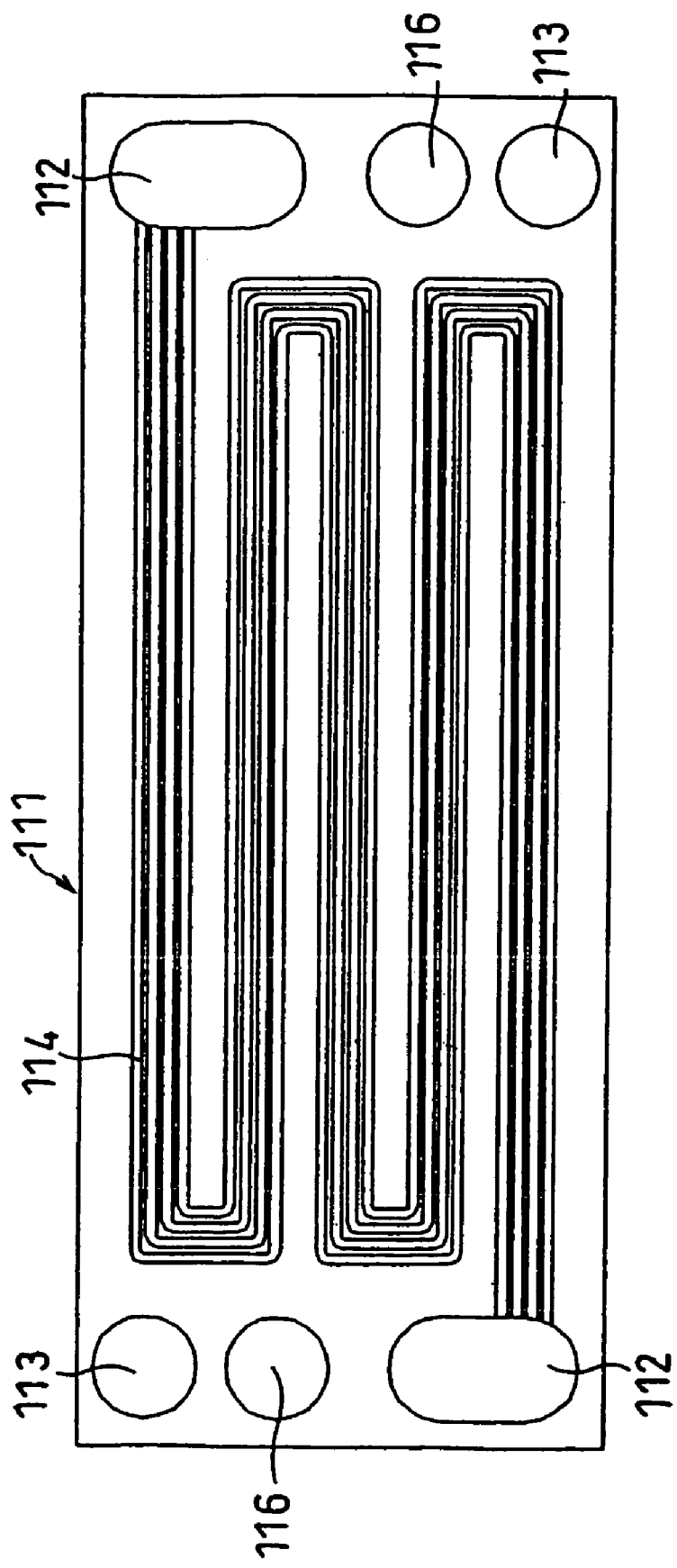
FIG. 30 is a front view of the cathode side of a separator plate of the fuel cell in Embodiment 8 of the present invention.
Figure 31:
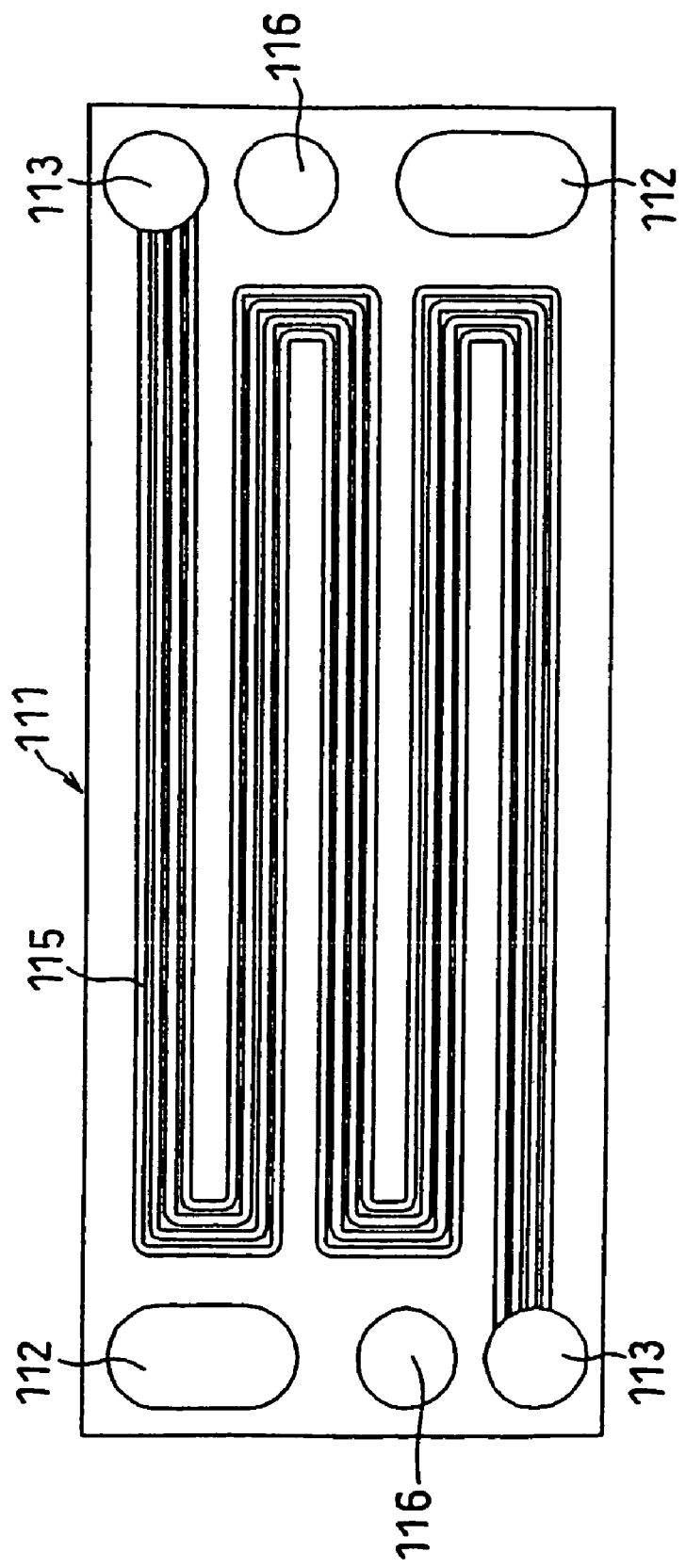
FIG. 31 is a front view of the anode side of the separator plate of the fuel cell in Embodiment 8 of the present invention.

FIGS. 30 and 31 are front views of the separator plate seen from the cathode side and the anode side, respectively. It has the gas flow channel 114 communicating with a pair of the manifold apertures 112 on its cathode side and has the gas flow channel 115 communicating with a pair of the manifold apertures 113 on its anode side. The mist discharge groove 124 of the separator plate 121a, as shown in FIG. 29, is formed so as to communicate with a pair of the oxidant gas manifold apertures 122 similarly to the oxidant gas flow channel 114. The mist discharge groove 125 of the separator plate 121b, as shown in FIG. 29, is formed so as to communicate with a pair of the fuel gas manifold apertures 123 similarly to the fuel gas flow channel 115. The pattern of these grooves 124 and 125 is merely an example, and is not to be limited to the pattern as illustrated in the figure.

As described above, in this embodiment, additional separator plates 121a and 121b are provided at the ends of the cell stack. The separator plate 121a and the separator plate 121b are provided with the mist discharge groove 124 communicating with the oxidant gas supply channel and the mist discharge groove 125 communicating with the fuel gas supply channel, respectively. The sides of the grooves contact the current collector plates.

In a fuel cell having this structure, the water contained in the oxidant gas and fuel gas may condense on the current collector plates 128a and 128b, and on the separator plates 121a and 121b, which contact the current collector plates to form mist due to heat dissipation from the end plates 129a and 129b. However, such mist is discharged to the outside from the mist discharge grooves 124 and 125 formed at the interface between the separator plates 121a and 121b and the current collector plates via the oxidant gas discharge path and the fuel gas discharge path, respectively. Therefore, the mist is prevented from entering the gas flow channels 114 and 115 located adjacent thereto, so that the blockage of the gas flow channels does not occur and stable gas distribution therefore becomes possible. As described, the present invention enables stable operation of the cell and eliminates the need for excessive heat insulation structures.

Example 7

A cathode catalyst was prepared by placing platinum particles having an average particle size of approximately 30 Å in a weight ratio of 25:75 on carbon fine powder having an average particle size of 30 nm (DENKA BLACK, manufactured by Denki Kagaku Kogyo K.K.). An anode catalyst was prepared by placing platinum-ruthenium particles (platinum/ruthenium weight ratio 50:50) in a weight ratio of 50:50 on DENKA BLACK carbon fine powder having an average particle size of 30 nm. A dispersion of each of these catalyst powders in isopropanol was mixed with a dispersion of perfluorocarbon sulfonic acid powder in ethyl alcohol to form a paste. Using these pastes, a cathode catalyst layer was formed by screen printing onto one side of a 250 μm thick carbon fiber nonwoven fabric to form a cathode. An anode catalyst layer was formed on another 250 μm thick carbon fiber nonwoven fabric to form an anode. The content of catalyst metal in each layer was to 0.5 mg/cm$^2$, and the content of perfluorocarbon sulfonic acid was to 1.2 mg/cm$^2$.

The cathode and the anode were bonded by hot pressing to the opposing sides of the center part of a hydrogen-ion conductive polymer electrolyte membrane in such a manner that the printed catalyst layers were brought in contact with the electrolyte membrane. The area of the conductive polymer electrolyte membrane was slightly larger than that of the cathode and anode. The hydrogen-ion conductive polymer electrolyte was a thin film of perfluorocarbon sulfonic acid (Nafion 112 manufactured by E.I. Du Pont de Nemours & Co. Inc. of the United State) having a thickness of 25 μm. Further, gaskets, punched out into the same outer shape as that of the separator plate, were bonded by hot pressing to the outer periphery of the electrodes so as to sandwich the electrolyte membrane, whereby an MEA (membrane-electrode assembly) was produced.

Using 100 MEAs, a fuel cell as illustrated in FIGS. 27 to 29 was assembled. As a comparative example, a cell without the groove 124 of the separator plate 121a and the groove 125 of the separator plate 121b was also assembled.

Figure 34:
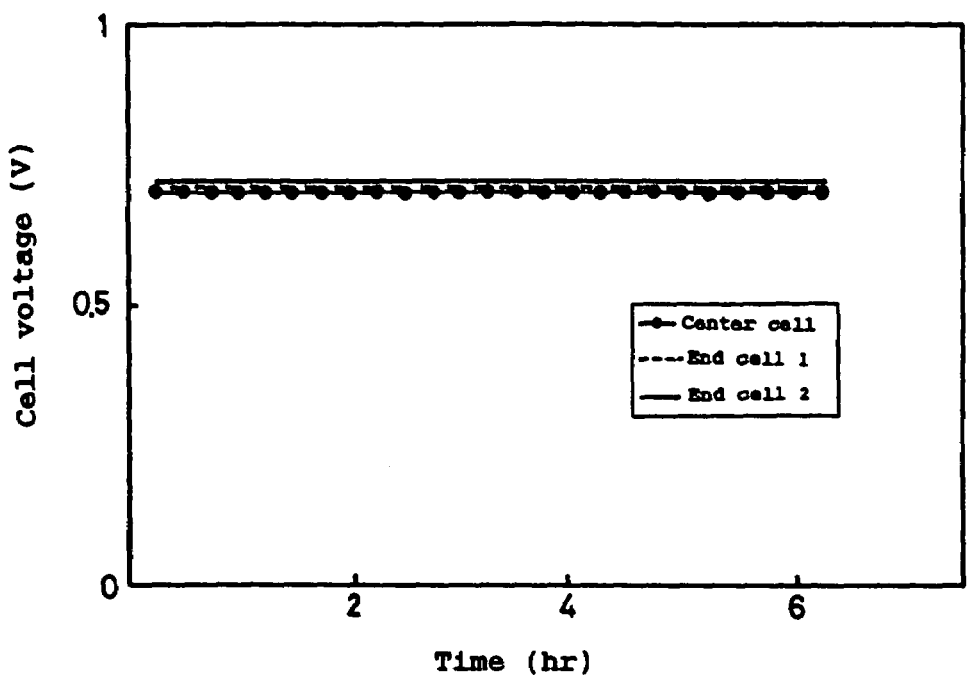
FIG. 34 is a plot indicating change with time in voltage of certain unit cells of a cell in Embodiment 8 of the present invention.
Figure 35:
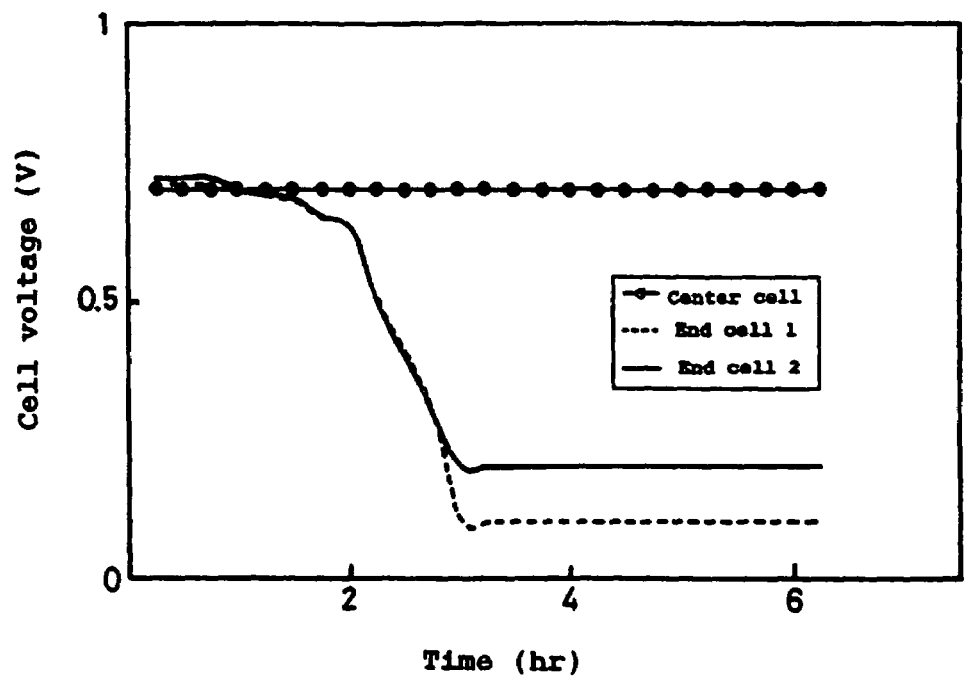
FIG. 35 is a plot indicating change with time in voltage of certain unit cells of a cell in a comparative example.

While these cells were retained at a temperature of 75° C., a simulated reformed gas (80% hydrogen by volume, 20% carbon dioxide by volume, and 50 ppm carbon monoxide), humidified and heated to have a dew point of 75° C., and air, humidified and heated to have a dew point of 50° C., were supplied to the anode and the cathode, respectively. These cells were operated under the conditions of a fuel utilization rate of 80%, oxygen utilization rate of 50%, and current density of 0.3 A/cm$^2$. The change in cell voltage with passage of time was examined on the cell at the central portion and the cells located at the ends. The characteristics of the cell of this example and the characteristics of the cell of the comparative example are shown in FIG. 34 and FIG. 35, respectively. As is apparent from these figures, in the stacked cell of the comparative example, the voltages of the cells located at the ends dropped sharply after a lapse of a certain time, whereas in the cell of this example, no voltage drop occurred due to the effect of the mist discharge grooves.

Embodiment 9

FIG. 32 is a cross-sectional view of a fuel cell of this embodiment cut along the counterpart of the line X-X of FIG. 27. The basic structure of this fuel cell is the same as that of Embodiment 8, and the same reference numerals represent the same components, as described above for Embodiment 8.

In this embodiment, separator plates 111a and 111b at the ends of a cell stack function only as a cathode-side separator plate and an anode-side separator plate, respectively. Current collector plates 128a and 128b contacting these separator plates have a mist discharge groove 124 communicating with oxidant gas manifold apertures, which is on the upper side of the figure. A mist discharge groove 125 communicating with fuel gas manifold apertures is on the lower side thereof.

In this fuel cell, the water mist produced between the separator plate 111a and the current collector plate 128a and between the current collector plate 128b and the insulating plate 127b is discharged to outside from the grooves 125 of the current collector plates 128a and 128b, respectively, via a fuel gas discharge path. Also, the water mist produced between the current collector plate 128a and the insulating plate 127a and between the separator plate 111b and the current collector plate 128b is discharged to outside from grooves 124 of the current collector plates 128a and 128b, respectively, via an oxidant gas discharge path.

Embodiment 10

Figure 33:
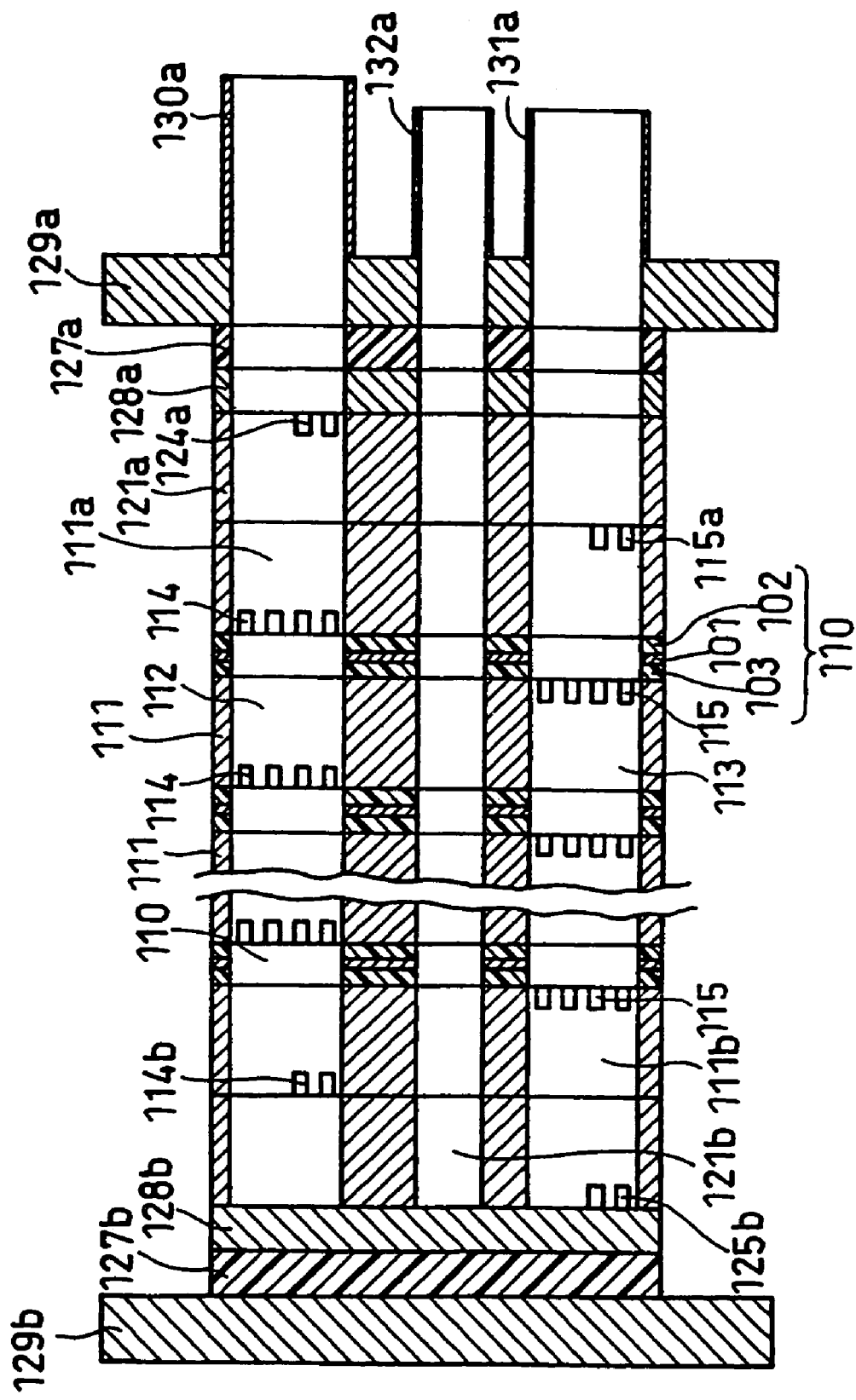
FIG. 33 is a longitudinal sectional view of a fuel cell in Embodiment 10 of the present invention.

FIG. 33 is a cross-sectional view of a fuel cell of this embodiment cut along the counterpart of the line X-X of FIG. 27. The basic structure of this fuel cell is the same as that of Embodiment 8, and the same reference numerals represent the same components as in Embodiment 8.

In this embodiment, the mist discharge groove is so configured that its portions connecting with manifold apertures are unevenly located to the lower side of the manifold apertures in the direction of gravity at the installation position of the cell. That is, a groove 115a on the right side of a separator plate 111a and a groove 125b on the left side of a separator plate 121b, both of which communicate with a fuel gas discharge path, are so configured that their portions connecting with manifold apertures are unevenly located to the lower side of the manifold apertures in the direction of gravity. In the separator plate 111 of FIG. 31, the fuel gas flow channel 115 is so configured that its portions connecting with the manifold apertures 113 are almost evenly arranged with respect to the manifold apertures. The grooves 115a and 125b, which correspond to this flow channel, are unevenly located to the lower side of the manifold apertures. Also, a groove 124a on the right side of a separator plate 121a and a groove 114b on the left side of a separator plate 111b, both of which communicate with an oxidant gas discharge path, are so configured that their portions connecting with manifold apertures are unevenly located to the lower side of the manifold apertures in the direction of gravity.

With this structure, even if the water contained in the gases condenses on the current collector plates and the separator plates contacting the current collector plates to form mist due to heat dissipation from the end plates, the mist collected by gravitation is effectively discharged from the mist discharge grooves arranged on the lower side of the direction of gravity.

Embodiment 11

In this embodiment, in a cell having the above-described structure, mist discharge grooves are provided with a hydrophilic coating comprising a polyurethane resin (trade name M1210, manufactured by TOAGOSEI CO., LTD) by photopolymerization. The hydrophilic coating surface allows the condensation-induced mist to be discharged effectively without causing it to build up in the mist discharge grooves.

For the hydrophilicity treatment of the mist discharge grooves, it is also possible to use polyvinyl alcohol, polyester-type resin (manufactured by Nippon Kayaku Co., Ltd.), 2-hydroxyl acrylate resin, bovine serum albumin (BSA), polyglutamic acid, silica gel or the like. The same effects were obtained, for example, when the inner surfaces of the mist discharge grooves were roughened by sandblasting treatment in the case of conductive separator plates made of a carbon-based material and when the inner surfaces of the mist discharge grooves formed in current collector plates were coated with titanium and were subjected to heat treatment of 400° C. under an oxygen atmosphere for one hour to form a titanium oxide film on the surfaces thereof.

Embodiment 12

In this embodiment, in a cell having the above-described structure, polyester woven fabric is inserted in mist discharge grooves as a water absorbing material. Since the mist produced by condensation is absorbed by the water absorbing material of the mist discharge grooves, it is effectively collected to the grooves and discharged by the pressure of the oxidant gas or fuel gas.

As the water absorbing material, it is also possible to use polyethylene terephthalate, rayon, nylon, material composed mainly of blended fiber thereof, or the like.

Also, the use of fiber or porous body of carbon, stainless steel or titanium as the water absorbing material allows reduction in contact resistance between the current collector plate and the separator plate, as well as the above-described effect of the water absorbing material, so that the effect of improving cell performance can also be obtained.

As described above, the present invention can provide a polymer electrolyte fuel cell which exhibits stable performance by reducing the difference in output between the cells closest to end plates and the other cells. Also, in the event of occurrence of mist in a cell stack and of water clogging due to condensation, it is possible to readily eliminate them and restore the performance.

While this invention has been described with reference to several preferred embodiments, it is contemplated that various alterations and modifications thereof will become apparent to those skilled in the art upon a reading of the preceding detailed description. It is therefore intended that the following appended claims be interpreted as including all such alterations and modifications as fall within the true spirit and scope of this invention.

What is claimed is:

1. A polymer electrolyte fuel cell comprising:
a cell stack in which a plurality of unit cells each comprising a polymer electrolyte membrane and an anode and a cathode sandwiching said electrolyte membrane are stacked with a plurality of conductive separator plates located on either side of each unit cell;
a pair of current collector plates and a pair of end plates, both of which sandwich said cell stack;
wherein the plurality of conductive separator plates includes at least one conductive separator plate located between at least one of the end plates and the unit cell located closest to said one of the end plates;
supply and discharge manifolds for a fuel gas and an oxidant gas, through which the fuel gas and the oxidant gas are supplied and discharged to and from the anode and the cathode of the cell stack, respectively
wherein said current collector plates have a mist discharge groove in fluid communication with said supply and discharge manifolds for the fuel gas or oxidant gas in their surfaces contacting the conductive separator plates, and
wherein the conductive separator plate between at least one of the end plates and the unit cell located closest to said one of the end plates has no coolant flow channel therein.

2. The polymer electrolyte fuel cell in accordance with claim 1, wherein portions of said mist discharge groove in fluid communication with said supply and discharge manifolds for the fuel gas or oxidant gas are unevenly located to the lower side with respect to the direction of gravity in which said cell stack is installed.

3. The polymer electrolyte fuel cell in accordance with claim 1, wherein said mist discharge groove is subjected to hydrophilicity treatment.

4. The polymer electrolyte fuel cell in accordance with claim 1, wherein a water absorbing material is provided in said mist discharge groove.

* * * * *